(12) United States Patent
Miyazaki et al.

(10) Patent No.: US 7,729,375 B2
(45) Date of Patent: Jun. 1, 2010

(54) POWER LINE COMMUNICATION APPARATUS AND DATA RELAY METHOD

(75) Inventors: Tomiya Miyazaki, Fukuoka (JP); Eiji Kobayashi, Fukuoka (JP)

(73) Assignee: Panasonic Corporation, Osaka (JP)

( * ) Notice: Subject to any disclaimer, the term of this patent is extended or adjusted under 35 U.S.C. 154(b) by 747 days.

(21) Appl. No.: 11/582,979

(22) Filed: Oct. 19, 2006

(65) Prior Publication Data
US 2007/0091925 A1  Apr. 26, 2007

(30) Foreign Application Priority Data
Oct. 20, 2005  (JP) .............................. 2005-305968

(51) Int. Cl.
*H04L 5/16* (2006.01)
(52) U.S. Cl. .................. 370/466; 340/310.11
(58) Field of Classification Search ................. 370/458, 370/401, 442, 466, 469, 229; 340/310.11
See application file for complete search history.

(56) References Cited
U.S. PATENT DOCUMENTS
6,130,896 A  10/2000  Lueker et al.

| | | | |
|---|---|---|---|
| 2004/0160990 A1 * | 8/2004 | Logvinov et al. | 370/509 |
| 2005/0047379 A1 * | 3/2005 | Boyden et al. | 370/338 |
| 2006/0018399 A1 * | 1/2006 | Miyazakii et al. | 375/295 |
| 2008/0040777 A1 * | 2/2008 | Aihara et al. | 726/4 |

FOREIGN PATENT DOCUMENTS

| JP | 62219721 | 9/1987 |
|---|---|---|
| JP | 62219824 | 9/1987 |
| JP | 2000165304 | 6/2000 |
| JP | 2001136229 | 5/2001 |
| JP | 2002374189 | 12/2002 |

* cited by examiner

*Primary Examiner*—Brian D Nguyen
(74) *Attorney, Agent, or Firm*—Dickinson Wright PLLC

(57) ABSTRACT

The PLC 20 adaptor corresponding to a power line communication apparatus has four PLC bridges 30A to 30D, each of which is correspondingly connected to Ethernet communication connectors 26A to 26D, operation mode setting switches 27A to 27D, display units 28A to 28D. Each PLC bridge 30A to 30D includes a PLC modem unit 301, a bridge unit 302, an Ethernet IF unit 303, and a communication control unit 304. The communication control unit 304 obtains data type information on the basis of setting conditions of switches 27A to 27D corresponding to each communication port. Since the time slot required for the communication link corresponding to the communication port of the PLC network can be obtained on the basis of the data type information, the reservation request can be transmitted to the control terminal.

15 Claims, 17 Drawing Sheets

POWER LINE COMMUNICATION APPARATUS AND DATA RELAY METHOD

BACKGROUND

The present invention relates to a power line communication apparatus and a data relay method, in which an electronic device having a communication function can be connected to a transmission path using a power line as well as a communication interface such as an Ethernet (Registered Trademark), and data can be transmitted between the electronic device and the transmission path.

For example, a system capable of easily implementing communication operations in a house by communicatably connecting a plurality of devices including an information device such as a personal computer and a variety of electric devices such as a television set, a recorder device, a video reproducing device, and an Internet protocol (IP) telephone with one another on a predetermined communication network has been proposed. When a wired data communication is implemented in a house, typically, a cable used as a transmission path or a wire line including connectors should be provided in necessary areas. Therefore, various construction processes are necessary when a communication system is established.

In a house, a commercial electric power voltage, such as AC 120V (60 Hz) or 100V (50/60 Hz) is used in most of the cases. Therefore, a power line for supplying this commercial electric power is already provided in every region in a house. This power line can be used as a transmission path for data communication by connecting a communication device to an electric socket of a commercial electric power to obtain a transmission path without installing a separate wire line for data communication.

Such a power line communication (PLC) technology for using the power line in communication is disclosed in Japanese Patent Application Publication No. 2000-165304. In the present, some manufacturers are studying or developing this PLC technology for a predetermined frequency band (such as 1.7 MHz to 80 MHz in U.S. and 2 MHz to 30 MHz in Japan). Specifically, it has been conceived that multi-carrier signals are generated using a plurality of sub-carriers as in an orthogonal frequency division multiplexing (OFDM) method and transmitted through a power line.

In addition, the electric devices having a communication function based on an Internet protocol typically use an Ethernet (Registered Trademark) interface as a standard communication interface. Therefore, when a communication network is constructed by using a power line as a transmission path in a house, it is necessary to provide a bridge unit for relaying data transmission between a power line and an Ethernet (Registered Trademark) communication interface. In this case, in order for the bridge unit to perform communication through the power line, the bridge unit should have an internal modem unit (i.e., a PLC bridge) for power line communication. Otherwise, the bridge unit should have an external modem unit (i.e., a PLC modem unit) for power line communication.

However, a power line wiring in an indoor environment is abnormally complicated, and a wiring condition is significantly different from each building. Therefore, performance of the power line as a transmission path is significantly different in every place in the indoor environment. Furthermore, since types of electric devices connected to this power line are also different, various noises and variations in impedance may possibly occur. For this reason, when communication is performed via the power line, a desired communication rate may not be obtained, or a communication quality may be degraded due to the reduced signal-to-noise (S/N) ratio in comparison with a dedicated wired transmission path.

Accordingly, in the power line communication, a transmission path is predicted in a predetermined timing before or during the communication on a transmission path between a transmit terminal and a receive terminal, transmission path conditions (i.e., transmission path characteristics) such as the S/N ratio are measured in order to set transmission parameters such that a maximum transmission rate (i.e., a bit rate) can be obtained with an allowable range. In this case, as a transmission parameter, modulation factors (i.e., a data duplication rate) of each carrier in a multi-carrier signal are determined. When the condition of the transmission path is satisfactory, a data transmission amount within a unit time interval is increased (i.e., a bit rate is increased) by increasing the modulation factor. On the contrary, when the condition of the transmission path is not satisfactory, the data transmission amount within a unit time interval is reduced (i.e., the bit rate is reduced) by decreasing the modulation factor. As a result, it is possible to reduce an error rate during communication under a predetermined value.

Meanwhile, when various electric devices are connected with one another on a network in a house to transmit streaming data such as video or audio data, it is necessary to guarantee a quality of service (QoS) in order to prevent loss of data.

However, according to a conventional power line communication apparatus, there was no means for guaranteeing the QoS, and it was impossible to obtain a time slot by combining the power line communication with other communication interfaces such as Ethernet (Registered Trademark). Therefore, it was impossible to guarantee a satisfactory QoS when electric devices are connected to transmit the streaming data. As a result, errors such as loss of data may occur.

As described above, in a conventional power line communication apparatus, there was no means for guaranteeing the QoS, and it was impossible to obtain the time slot by combining the power line communication with other communication interfaces such as Ethernet (Registered Trademark). Therefore, it was impossible to guarantee a satisfactory QoS when the connected electric devices transmit streaming data. In addition, it was impossible to allocate the time slot to each communication line for connecting a predetermined electric device or control the priority.

SUMMARY

The present invention has been made to conceive the aforementioned problems, and provide a power line communication apparatus and a data relay method, by which an appropriate QoS can be guaranteed depending on connected electric devices, transmitted data, and the like, when a power line is used as a communication transmission path.

According to an aspect of the present invention, there is provided a data relay apparatus for relaying data, comprising: a first communication unit for performing communication via a power line; a second communication unit for performing communication via another communication line other than the power line; a time slot setting unit for setting a time slot on the basis of a format of the data; and a relay unit for relaying the data within the time slot set by the time slot setting unit between the first communication unit and the second communication unit.

According to the above construction, it is possible to obtain a time slot required for a communication link corresponding to the communication line on the power line communication (PLC) network using the first communication unit on the basis of the format of the data transmitted to a communication line other than the power line connected to the second communication unit. For example, a time slot reservation request may be issued to another power line communication apparatus functioning as a control terminal to obtain the time slot. As a result, it is possible to transmit data via the first and second communication units while a predetermined QoS is guaranteed by obtaining the time slot required for the data transmitted through the communication line connected to the second communication unit on the PLC network. Therefore, it is possible to guarantee an appropriate QoS depending on the electric devices connected to the communication line or the types of the data to be transmitted, when the power line is used as a communication transmission path, for example, even when the data requiring a satisfactory QoS, such as streaming data including video or audio, are transmitted.

In addition, according to another aspect of the present invention, there is provided a method of relaying data in a power line communication apparatus for transmitting data using a power line as a communication line, the method comprising steps of: performing first communication via the power line; performing second communication via at least one of communication lines other than the power line; setting a time slot on the basis of a format of the data; and relaying the data within the time slot set on the basis of the format of the data between the first communication and the second communication.

According to the above method, it is possible to allow the communication link of the communication line on a power line communication network used for the first communication to obtain a necessary time slot according to the format of the data transmitted through the communication line used for the second communication. For example, it is possible to obtain the time slot by issuing a time slot reservation request to another power line communication apparatus functioning as a control terminal.

According to the above method, it is possible to obtain the necessary time slot on the power line communication network for the data transmitted through the communication line used in the second communication, and guarantee a desired QoS while the data is transmitted via the first and second communication units. Therefore, it is possible to guarantee an appropriate QoS depending on the electric devices connected to the communication line or the type of the data to be transmitted when the power line is used as a communication transmission path, for example, even when a QoS should be guaranteed in transmission of the streaming data such as video or audio data.

It is possible to provide a power line communication apparatus and a data relay method, by which an appropriate QoS can be guaranteed depending on the connected electric devices and the type of data to be transmitted, when the power line is used as a communication transmission path.

There is provided a power line communication apparatus and a data relay method, by which an appropriate quality of service (QoS) can be guaranteed depending on the connected electric devices and the type of data to be transmitted, when the power line is used as a communication transmission path.

DETAILED DESCRIPTION

In the present embodiment, a power line communication (PLC) network is constructed by using a power line equipped in a house as a transmission path to provide streaming data such as video or audio data.

Herein, a "time slot" of the present embodiment includes a temporal channel which has a successive time interval and is capable of transmitting data between communication devices. Although, in the following descriptions, a time slot used in a Time Division Multiple Access (TDMA) method is exemplified, the time slot used in other methods such as a Carrier Sense Multiple Access with Collision Avoidance (CDMA/CA) or a Carrier Sense Multiple Access with Collision Detection (CSMA/CD) method may be adopted in the present invention.

Figure 1:
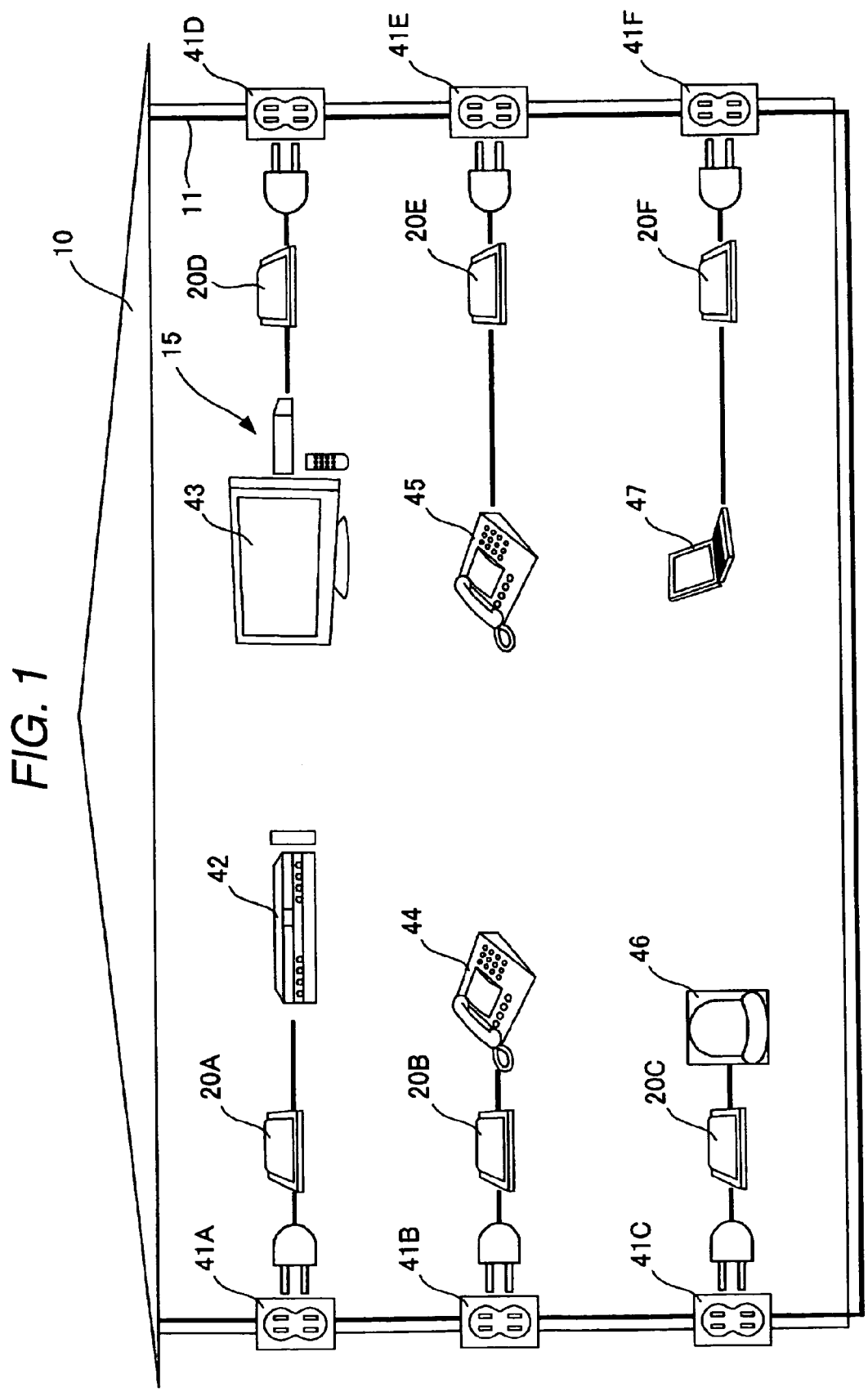
FIG. 1 is a schematic diagram illustrating an example of a communication system including a power line communication apparatus according to an embodiment.

As shown in FIG. 1, a power line 11 for supplying a commercial electric power is equipped in an inner space of a house 10, and AC sockets 41A to 41F connected to the power line 11 is provided in each room. A plurality of devices are connected to the AC sockets 41A to 41F, and in the drawing, PLC adaptors 20A to 20F are connected to the AC sockets 41A to 41F as an example of communication devices having a power line communication function. Specifically, a hard disk drive (HDD) recorder 42 which records and reproduces video data is connected to the PLC adaptor 20A, an Internet protocol (IP) telephone 44 which performs a voice over Internet protocol (VoIP) telephone communication is connected to the PLC adaptor 20B, an IP camera 46 which captures an image and transmits the captured image on an IP network is connected to the PLC adaptor 20C. In addition, a television set 43 such as a high definition plasma television set is connected to the PLC adaptor 20D, another IP telephone 45 is connected to the PLC adaptor 20E, and a personal computer (PC) 47 is connected to the PLC adaptor 20F.

Furthermore, communication interfaces such as an Ethernet (Registered Trademark) and a universal serial bus (USB) having a physical layer different from that of the power line communication are inserted between the PLC adaptor 20A and the HDD recorder 42, between the PLC adaptor 20B and the IP telephone 44, between the PLC adaptor 20C and the IP camera 46, between the PLC adaptor 20D and the television set 43, between the PLC adaptor 20E and the IP telephone 45, and between the PLC adaptor 20F and the PC 47. As a result, a PLC network 15 having a local power line communication function capable of transmit data by using the power line 11 as a common transmission path is constructed.

In the construction illustrated in FIG. 1, when high definition video information that can be reproduced in the HDD recorder 42 is distributed and displayed on the television set 43, streaming data of the video are transmitted via a path including the PLC adaptor 20A—the AC socket 41A—the power line 11—the AC socket 41D—the PLC adaptor 20D. In addition, when audio communication is established between the IP telephone 44 and the IP telephone 45 using VoIP interface, streaming data of a telephone call voice are transmitted via a path including the PLC adaptor 20B—the AC socket 41B—the power line 11—the AC socket 41E—the PLC adaptor 20E. When an image of an object captured by the IP camera 46 is monitored using the PC 47, the data on the captured image are transmitted via a path including the PLC adaptor 20C—the AC socket 41C—the power line 11—the AC socket 41F—the PLC adaptor 20F. When the data on the image captured by the IP camera 46 has a high definition and a high frame rate, they may be transmitted as the streaming data similarly to the above case. Otherwise, when they have a low definition, they can be transmitted as typical IP packet data.

Figure 2:
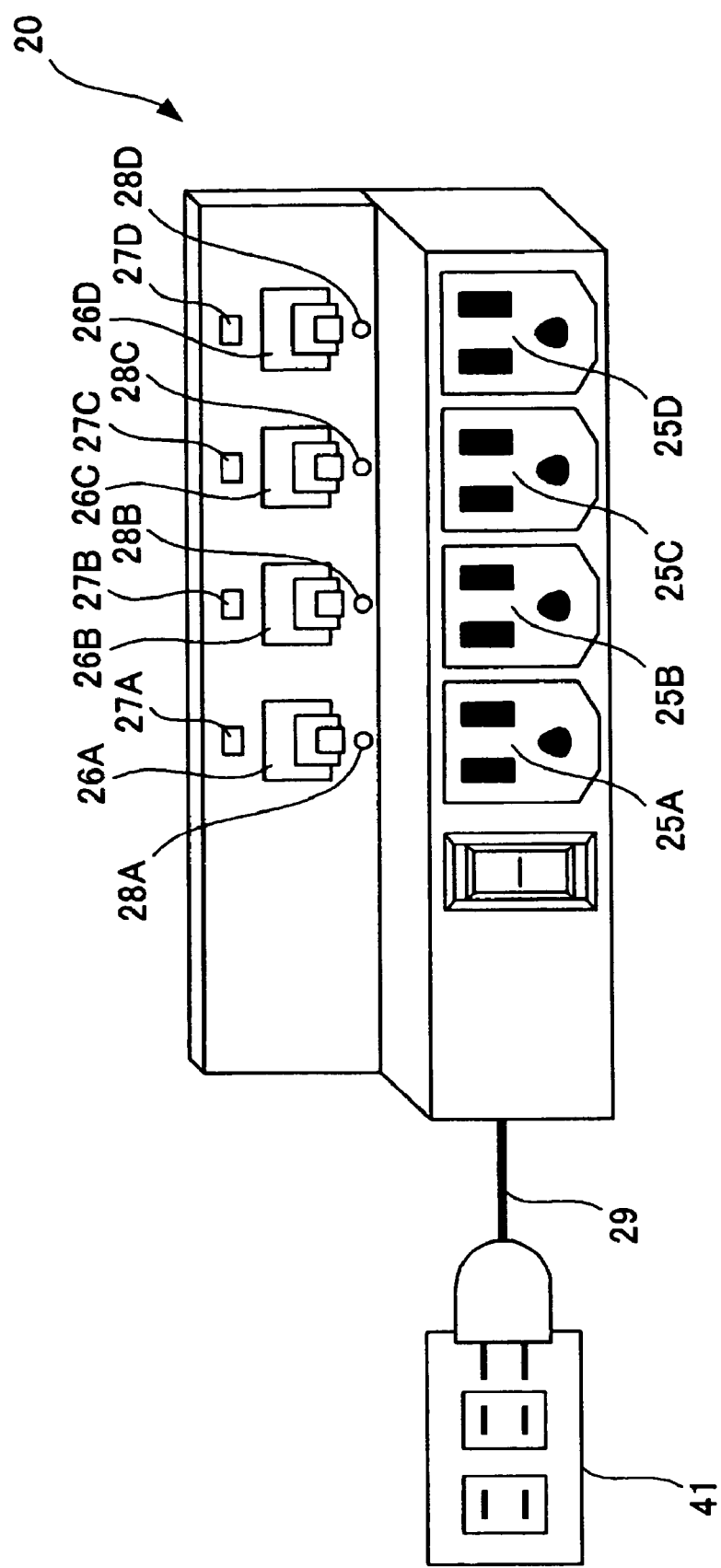
FIG. 2 is a diagram illustrating external appearance of a power line communication apparatus according to an embodiment.

The PLC adaptor 20 illustrated in FIG. 2 is a table top type as a detailed example of an assembly of the PLC adaptors 20A to 20F illustrated in FIG. 1. The PLC adaptor 20 according to the present invention also has a Ethernet (Registered Trademark) communication interface having a physical layer different from that of the power line communication so as to have a network communication function based on Ethernet (Registered Trademark) as well as a power line communication function for allowing the power line to be used as a transmission path.

The PLC adaptor 20 includes four AC sockets 25A to 25D for connecting AC power cords of electric devices, four communication connectors 26A to 26D such as an RJ45 connector for connecting communication cables from the electric devices, four switches 27A to 27D corresponding to a manipulation unit for performing a setting manipulation for each communication line, four display units 28A to 28D for displaying operation conditions such as a setting condition or a communication condition of each communication line, and an AC electric cord 29 corresponding to an example of a power input unit.

The AC electric cord 29 is connected to an AC socket 41 provided in the house in order to obtain a transmission path for power line communication as well as an AC power voltage (e.g., 100V) required to operate the electric devices, so that a commercial power voltage is received. AC electric cords of various electric devices such as a television set, a HDD recorder, an IP telephone, an IP camera, and a personal computer are connected to the AC sockets 25A and 25D provided in the PLC adaptor 20. In addition, the communication connectors 26A to 26D function as Ethernet (Registered Trademark) communication ports, and communication cables (such as a LAN cable) are connected to the communication connectors 26A to 26D so as to be connected to the communication ports of the electric devices. The LAN cable is an example of a transmission medium other than the power line. A coaxial cable or a typical telephone cable may be used as the transmission medium.

The switches 27A to 27D may include a slide switch, a DIP switch, or a dial switch. The switches function as a manipulation unit. The switches 27A to 27D receive a switching manipulation input for setting the communication lines (e.g., the Ethernet) corresponding to the communication connectors 26A to 26D. In this case, in order to guarantee the QoS of the communication link of each communication line, a user performs switching operations of the switches 27A to 27D by manually manipulating them.

The display units 28A to 28D are constructed of light emitting diodes (LEDs) or liquid crystal display panels in order to display operating conditions such as a setting condition or a communication condition of each communication line (e.g., Ethernet) corresponding to each communication connector 26A to 26D. For example, various information on the data transmission such as a transmission band set for each communication line and an actual data transmission speed on each communication line is displayed on the display units 28A to 28D depending on a type of the electric device connected to each communication connector 26A to 26D or a type of the data (contents) transmitted through each communication line. Conditions of the display units 28A to 28D may be indicated by a color of the LED, the number of turned-on LEDs, flickering by turning on/off the LED, or indicator images such as alphabetic or numerical characters displayed on the liquid crystal display panel.

Figure 3:
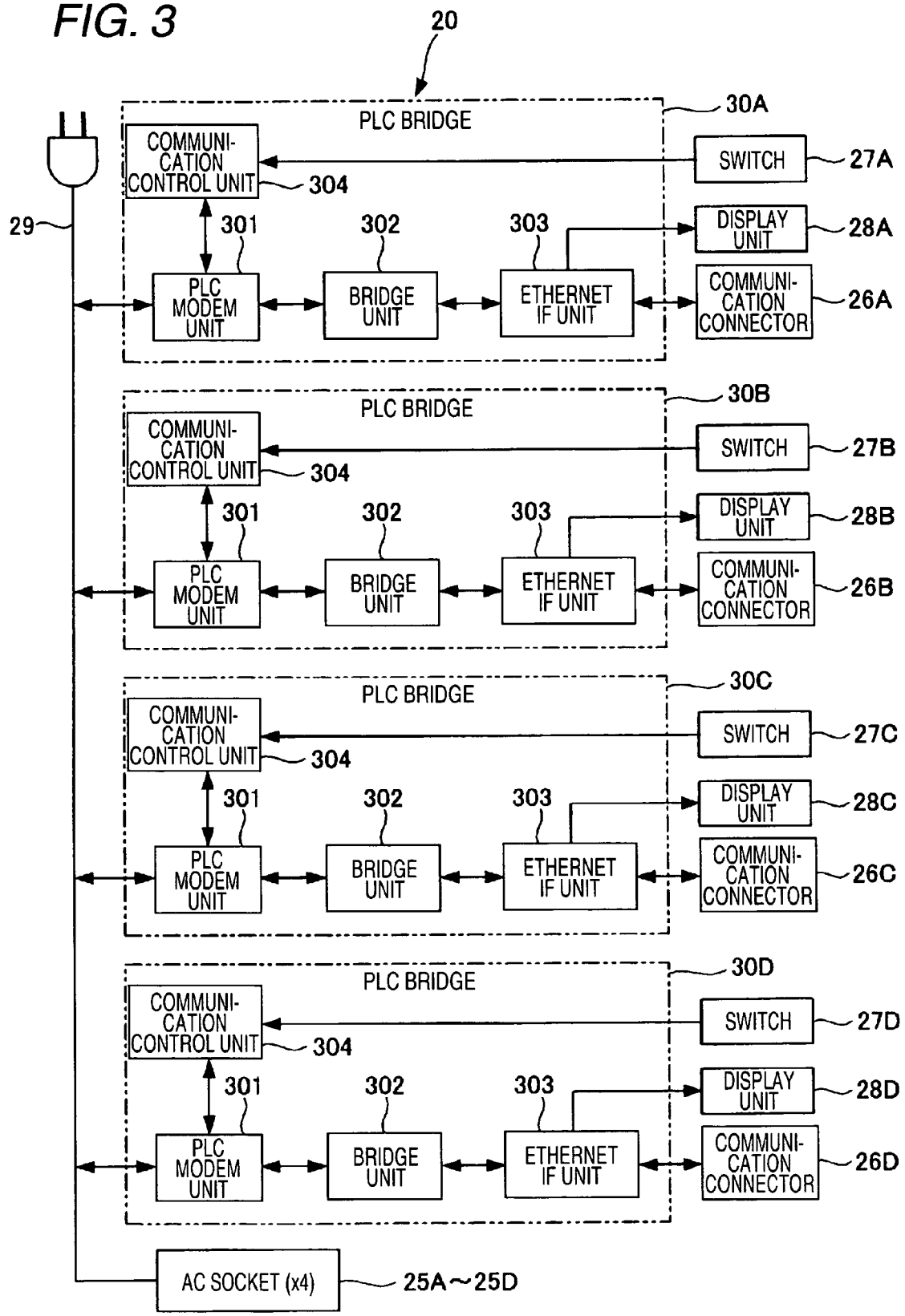
FIG. 3 is a block diagram illustrating an internal functional construction of a power line communication apparatus according to the first embodiment.

FIG. 3 is a block diagram illustrating an internal functional construction of the PLC adaptor 20 illustrated in FIG. 2. The PLC adaptor 20 includes four independent PLC bridges 30A to 30D connected to the communication connectors 26A to 26D, the switches 27A to 27D, and the display units 28A to 28D, respectively. Each PLC bridge 30A to 30D includes a PLC modem unit 301, a bridge unit 302, an Ethernet interface (IF) unit 303, and a communication control unit 304.

The PLC modem unit 301 is provided as an example of the first communication unit, and has a modem function needed to perform the power line communication on the PLC network. Specifically, the PLC modem unit 301 transmits and receives a multi-carrier signal generated from a plurality of sub-carriers on the basis of an OFDM (orthogonal frequency division multiplexing) method to/from a counterpart terminal. The Ethernet IF unit 303 is provided as an example of the second communication unit, and has a communication interface function needed to perform communication on an Ethernet (Registered Trademark) network. The bridge unit 302 is provided as an example of the relay unit, and has a protocol conversion function or a packet transformation function for the transmitted data. Also, the bridge unit 302 relays the data (i.e., at the communication interface) between the PLC network and the Ethernet network. The communication control unit 304 performs various control operations required in the communication. The communication control unit 304 has functions of a data type information obtaining unit and a time slot setting unit. Its control operations include a control operation for obtaining the time slot on the basis of the selection states of the switches 27A to 27D as described below.

On the PLC network 15 of the communication system illustrated in FIG. 1, a master device and slave devices are set among a plurality terminals of the power line communication devices, so that a communication control on a network is performed under the control of the master device. In the case of where a plurality of terminals constitutes a network, a master is defined as a terminal that controls communications of the other terminals, while a slave is defied as a terminal that communications of which is controlled by the master. In the construction illustrated in FIG. 1, one of the PLC adaptors 20A to 20F is selected as a master device, and other communication devices are selected as slave devices. The master device has a QoS control function for controlling the QoS of the PLC network in the communication control unit as one of the functions of the PLC device on a network. The master device transmits a beacon for obtaining a communication timing including the control information to the PLC network 15 with a predetermined period, and performs time slot reservation for allocating the time slot to the communication link established between particular communication devices within one period between the beacons, so that the QoS of the PLC network 15 is controlled. It is necessary to guarantee a predetermined QoS depending on the data transmission speed required for the data in order not to generate loss of data at the receiver side during the transmission of the streaming data, such as transmission of high definition video data (i.e., high definition (HD) video streaming) from the HDD recorder 42 to the television set 43, or transmission of audio data through the VoIP communication between the IP telephones 44 and 45, as shown in FIG. 1.

A time slot required to guarantee the QoS is allocated on the basis of the type of the data (contents) to be transmitted (on the basis of the transmission speed of the data). For example, the HD video contents transmission requires a maximum speed of 24 Mbps, the video signal transmission of a general television requires a maximum speed of 6 Mbps, phone call signal transmission of IP communication using the VoIP communication requires 128 Kbps (64K×2), transmission of audio contents such as a music requires 5.20 Mbps (384+706K×7). The time slot may have a different time interval depending on the type of the data to be transmitted as described above.

Although a Carrier Sense Multiple Access with Collision Avoidance (CDMA/CA) control is implemented when each terminal transmits data on the Ethernet (Registered Trademark) network, there is a possibility of collision of signals simultaneously transmitted from a plurality of terminals, and thus, it is not ensured that the time slot required for the data transmission can be always obtained. However, as in the first embodiment, in which the communication connectors 26A to 26D of Ethernet (Registered Trademark) communication ports are connected to the electric devices in a one-to-one manner, a dedicated time slot can be obtained in the transmission path using the Ethernet (Registered Trademark) communication interface.

In the construction of the present embodiment, when the data such as streaming data in which the QoS should be guaranteed is transmitted, it is very important to guarantee the QoS on the PLC network. Now, an operation for guaranteeing the time slot will be described.

Figure 4:
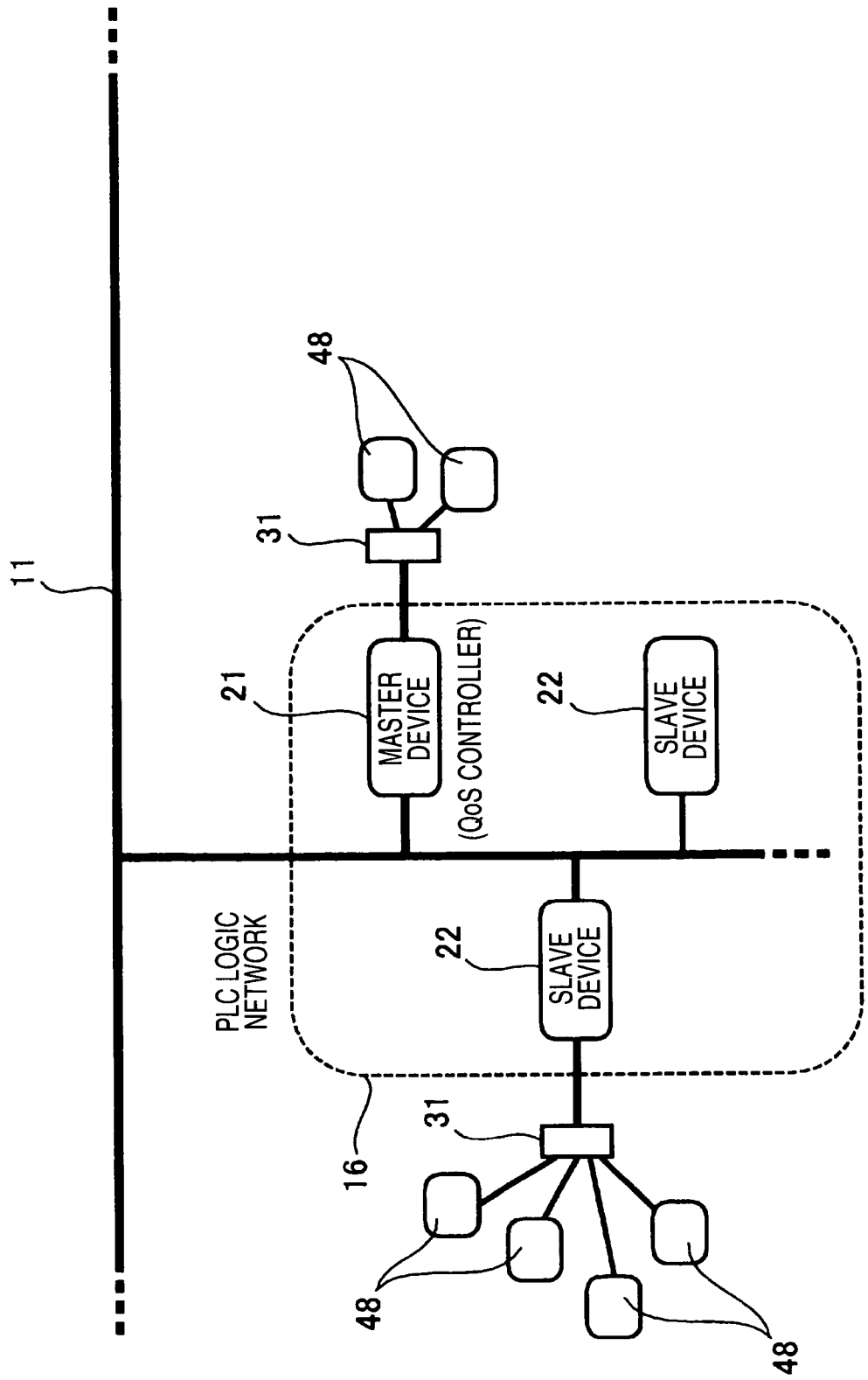
FIG. 4 is a block diagram illustrating a schematic construction of a PLC network according to an embodiment.

FIG. 4 is a block diagram illustrating a schematic construction of the PLC network. A plurality of PLC adaptors 21, 22, 22, . . . are connected to the power line 11, and a PLC device functioning as a master device 21 and a PLC device functioning as a slave device 22 are set. The master device 21 and the slave device 22 constitute a single PLC logic network 16. In the PLC logic network 16 (tied up in a dotted line), the master device 21 has a function of the transmission speed control unit. Although not shown in the drawing, a plurality of PLC logic network may be constructed by using a plurality of PLC devices connected in a common power line.

A relay unit 31 corresponding to the PLC bridge 30A to 30D is connected to the master device 21 and the slave device 22. Electric devices 48 such as a television set, a video recorder, a telephone, and a personal computer are connected via the relay unit 31. In addition, in the PLC adaptor 20 illustrated in FIG. 3 according to the present embodiment, the relay unit 31 is internally provided. In this case, data are transmitted from the master device 21 to the slave device 22 or from the slave device 22 to the master device 21 using the power line communication. On the contrary, data are transmitted from the master device 21 and the slave device 22 via the relay unit 31 to the electric device 48 using the Ethernet (Registered Trademark) communication interface.

The slave device 21 is a control terminal having a function of a QoS controller, and at least one slave device 21 is provided in the PLC logic network 16. The slave device 21 has control functions such as (1) management of information on terminals provided on a network, (2) receiving and scheduling a time slot reservation, and (3) transmitting the beacon with a predetermined period and notifying the schedule to each terminal. On the other hand, the slave device 22 communicates on the basis of the schedule described in the beacon transmitted on the network. As described above, the communication is established between the master device 21 and the slave device 22 on the PLC network, while the communication control is performed in a concentrated manner using the master device 21.

Figure 5:
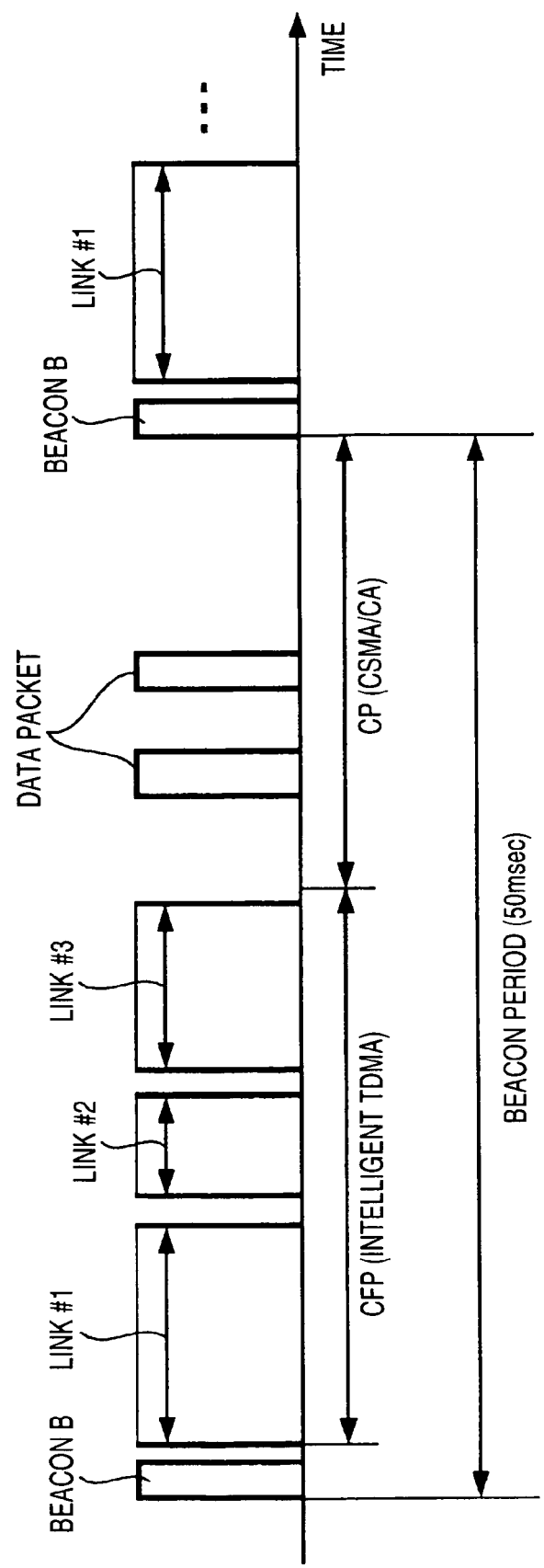
FIG. 5 is a timing chart illustrating an operation example for allocating a time slot on a PLC network according to an embodiment

FIG. 5 is a timing chart illustrating an operation example of allocating a time slot on a PLC network according to the present embodiment.

On the PLC network, as shown in FIG. 5, the beacon B is transmitted from the master device 21 at a regular interval with a predetermined period (for example, 50 msec). Within one period of the beacon B (hereinafter, referred to as a beacon period), data are transmitted/received between the communication devices on the basis of the scheduling of the slave device 21. In this case, allocation of the required time slot is set by the slave device 21 corresponding to the QoS controller for the communication link for transmitting the data required to guarantee the QoS, such as streaming data, among communication links established between communication devices, so that the time interval of the time slot used in the communication link is determined.

The beacon period is divided into a contention-free period (CFP) allocated to a former half based on an intelligent TDMA method and a contention period (CP) allocated to a latter half based on a CSMA/CA method. In other words, the contention-free period (CFP) and the contention period (CP) are mixed in each beacon period. In the contention-free period (CFP), the time slot is set on the basis of the intelligent TDMA method, in which the time interval is changed for each communication line, and the data are transmitted within each time slot. In a communication link for transmitting streaming data such as video or audio data that requires the time slot, a time slot having a predetermined time interval is allocated within the contention-free period (CFP) depending on the transmission speed of the corresponding data to guarantee the QoS. In the contention period (CP), data are transmitted on the basis of a CSMA/CA method at a predetermined timing in response to a communication request generated from each communication device. The data packet that does not require real-time transmission or successive transmission, such as transmission of PC data or control information, has a contention period (CP) and is intermittently transmitted. According to this data transmission construction, it is possible to simultaneously transmit the data, such as streaming data that should be successively transmitted while the QoS is guaranteed, and the data, such as PC data, that can be intermittently transmitted.

In the example shown in FIG. 5, within the contention-free period, each time slot is allocated to each of three communication links #1, #2, and #3. For example, the communication link #1 corresponds to the link for transmitting video data between the HDD recorder 42 and the television set 43 in the communication system illustrated in FIG. 1, and the communication link #2 corresponds to the link for transmitting voice data between the IP telephones 44 and 45. In this case, a transmission band is widened as the time interval of the time slot increases.

The master device 21 transmits information on the schedule of the time slots allocated to each communication link by inserting them in the beacon B during the CFP. As a result, various communication devices (including the master device 21 and the slave device 22) on the PLC network can identify an available time slot in the communication link established for a particular terminal by referring to the timing and information included in the beacon and perform data communication using the time slot allocated to their terminals.

Figure 6:
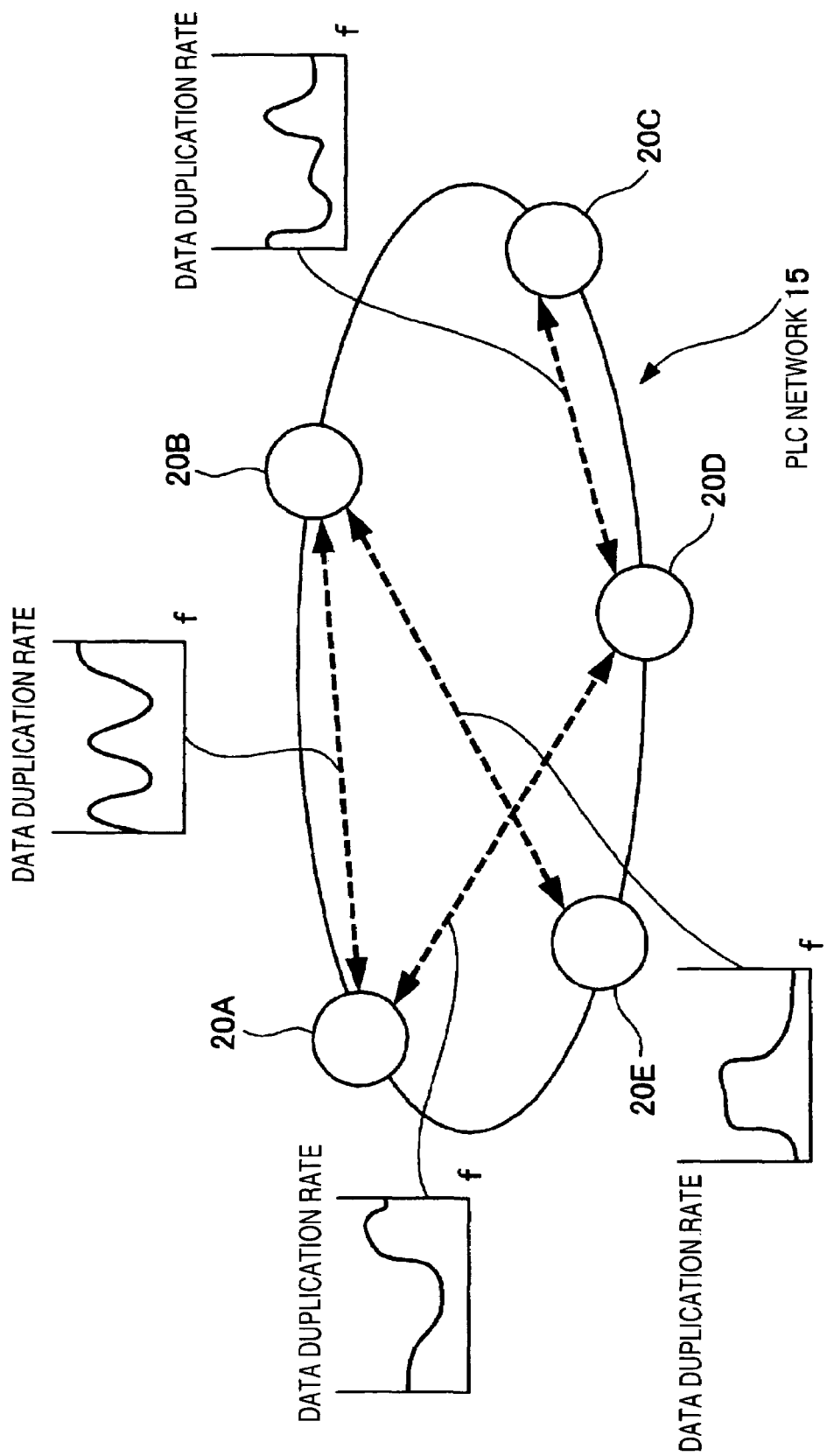
FIG. 6 is a schematic diagram illustrating a data duplication rate on a PLC network according to an embodiment.

The actually available size of the transmission range is changed depending on a maximum bit rate determined by a modulation method actually used by each communication link as well as the time interval of the time slot. FIG. 6 is a schematic diagram illustrating a detailed example of a data duplication rate on a PLC network according to the present embodiment.

Since the transmission paths between each of the communication devices of the PLC adaptors 20A to 20E have different conditions on the PLC network 15, different transmission parameters (such as a modulation pattern that shows a modulation method) are set for each transmission path. Referring to FIG. 6, as an example of the transmission parameters, a modulation factor (corresponding to the data duplication rate) of each sub-carrier frequency of a multi-carrier signal on a frequency axis are represented for each transmission path. A communication capability within a unit time (i.e., a maximum bit rate) is determined depending on the transmission parameters.

In such a PLC network 15, transmission path estimation is performed in every predetermined timing before the communication starts or during the communication for each transmission path between communication units to measure the condition (such as a S/N ratio) of the transmission path, and the transmission parameters are set such that a maximum transmission speed (i.e., a bit rate) can be obtained within an allowable range. For example, a modulation method having a high modulation factor such as 256QAM and 16QAM is adopted in an allowable environment having little noise and a high S/N ratio in the transmission path. On the contrary, a modulation method having a low modulation factor such as 4QAM and 2PAM is adopted in an bad environment having much noise and a low S/N ratio. In addition, sub-carriers actually used in the communication and sub-carriers that are not actually used are determined from a plurality of sub-carriers on the basis of the conditions of the detected noises.

Accordingly, different transmission parameters are set for each transmission path established between the communication devices.

The master device having the aforementioned QoS controller function controls allocation of the time interval of the time slot to a particular communication link established between the communication devices in such a way that a transmission band capable of providing a highest bit rate within a maximum bit rate range established for each transmission path of each communication device as described above can be obtained.

Figure 7:
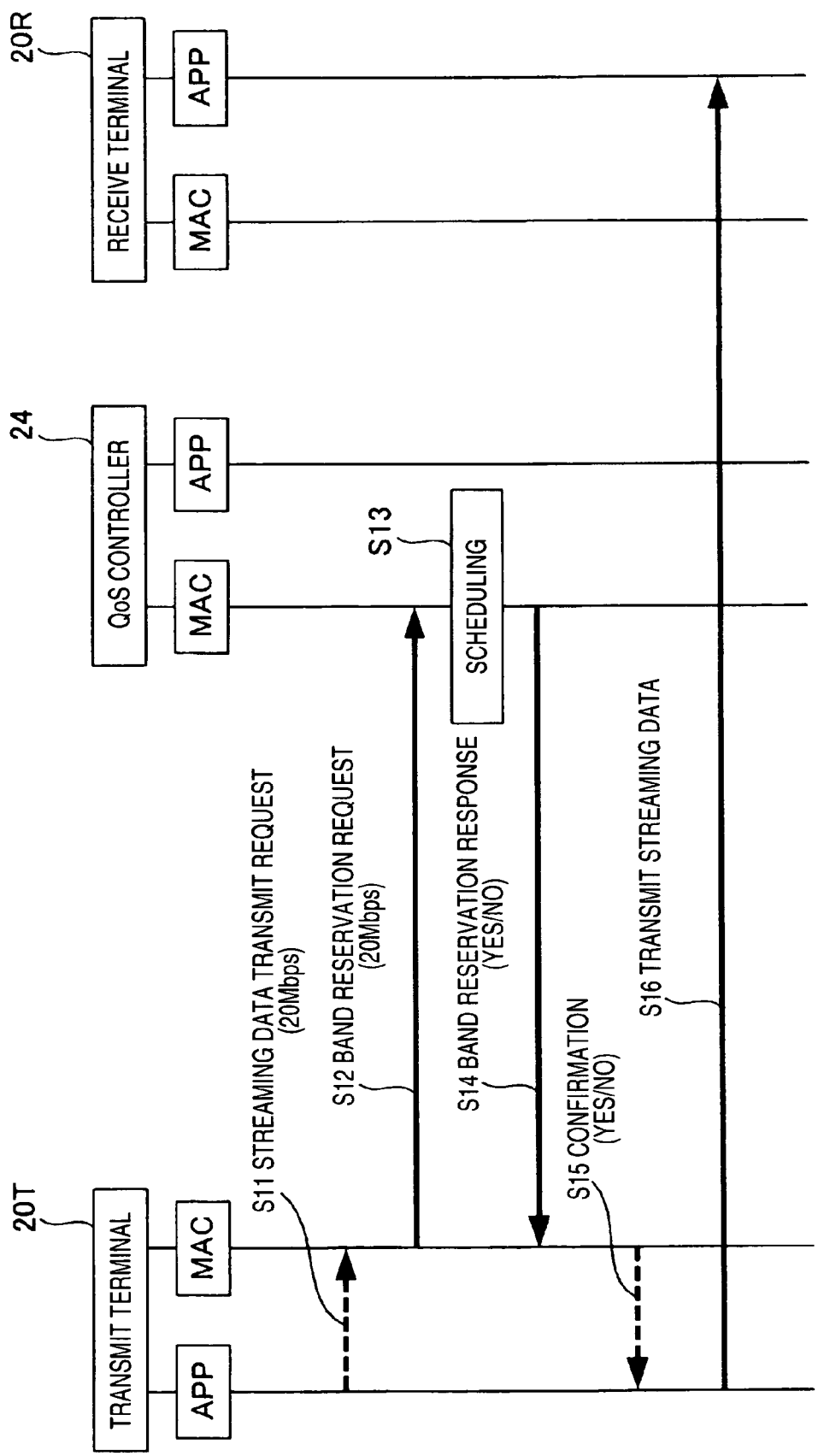
FIG. 7 is a sequence diagram illustrating an operation sequence in a time slot allocation process on a PLC network according an embodiment.

FIG. 7 is a sequence diagram illustrating an operation means of processing allocation of time slots on the PLC network according the present embodiment. Now, the time slot allocation process will be described by using three communication devices including a QoS controller 24 corresponding to the master device 21, a transmit terminal 20T corresponding to the transmission means of the data receive side among the slave devices 22, a receive terminal 20R corresponding to the communication device of the data receive side. At least a transmit terminal 20T is the PLC adaptor 20 having the construction illustrated in FIGS. 2 and 3 among the communication devices.

In the PLC adaptor 20 of the transmit terminal 20T, an operation mode for guaranteeing the QoS is set for each of the communication connectors 26D to 26D of each communication port provided for connecting the electric devices depending on the selection states of the switches 27A to 27D. More specifically, the switches 27A to 27D output the input signal to the PLC-LSI 131, which will described later, when a user manipulates the switches in the operation mode. The PLC-LSI 131 that has received the input signal sets the operation mode. In other words, the operation mode may be set on the basis of the type of the input signal (such as a voltage). The following five modes are set as operation modes, and they can be manually selected by the switches 27A to 27D.

Mode A (for video A): is set to obtain a time slot appropriate for a bit rate of high definition video contents such as a high vision video.

Mode B (for video B): is set to obtain a time slot appropriate for a bit rate of normal video contents such as a television program. Since the definition is significantly different between normal video contents such as a television program and high definition video contents such as a high-vision video, and the bit rate is significantly different, it is preferable to use two modes for video contents.

Mode C (for VoIP): is set to obtain a time slot appropriate for a bit rate of the VoIP contents such as an IP telephone.

Mode D (for typical transmission): is set to transmit the data of normal contents that do not care about a transmission delay time. The selected time slot is not modified.

Mode E (for automatic transmission): is set to automatically obtain the time slot required to guarantee the QoS by automatically identifying the type of the contents to be transmitted.

When communication is established by connecting the electric device to the communication connector of the PLC adaptor 20, the communication control unit 304 of the PLC bridge 30A reads a selection state of the switch 27A to identify the operation mode. When an electric device such as a HDD recorder capable of providing video contents such as a television program is connected to the communication network 26A, a user previously manipulates the switch 27A such that the mode B or E can be selected.

When an application program of the transmit terminal 20T starts to transmit the streaming data, a request to transmit the streaming data is issued from an upper layer application APP to a lower layer media access control MAC (S11). In this example, it is assumed that streaming data is transmitted with a maximum transmission speed of 20 Mbps. In the streaming data such as video or audio data, a real-time property or successive connectivity is important. Also, a time slot capable of providing a transmission speed required to transmit the data in the transmission path should be obtained in order not to generate loss of data during the transmission. Therefore, the transmit terminal 20T issues a time slot reservation request for obtaining the required time slot depending on the type of the streaming data to be transmitted in the lower layer MAC (S12).

In this case, the communication control unit 304 of the PLC adaptor 20 identifies the operation mode on the basis of the selection state of the switch 27A of its port as a function of the data type information obtaining unit and issues the time slot reservation request so as to obtain the time slot corresponding to the operation mode as a function of the time slot setting unit. For example, when the mode B is selected by the switch 27A, a time slot reservation request for obtaining the time slot appropriate for a bit rate of the video contents is issued. This time slot reservation request is notified to the lower layer MAC of the QoS controller 24.

When the mode E is selected by the switch 27A of the PLC adaptor 20, the type of the transmission data is automatically identified by the communication control unit 304 as a function of the data type information obtaining unit, and the time slot reservation request for reserving the time slot required to guarantee the QoS is issued as a function of the time slot setting unit. In the data transmission using the Internet protocol (IP), a UDP short packet is used for the VoIP data, and a UDP long packet is used for the video data. For this purpose, whether or not the data relates to the VoIP or the video (i.e., the type of the data) may be identified by referring to the header of the transmitted data packet. The communication control unit 304 automatically determines the size of the time slot that should be obtained on the basis of the result of the identification and issues the time slot reservation request for obtaining the necessary time slots.

When the time slot reservation request is received from the transmit terminal 20T, the QoS controller 24 performs a scheduling for allocating the time interval of the time slot to the corresponding communication link depending on the size of the requested time slot (S13). In this case, as shown in FIG. 5, a time slot is allocated to each communication link. Although the requested time slot may not be always obtained, whether or not the time slot is successfully obtained can be notified to the transmit terminal 20T by using the time slot reservation response (S14).

In other words, when the QoS controller 24 obtains the time slot, it is necessary to recognize a maximum bit rate for each transmission path as described above. For this reason, transmission path estimation is previously performed for the transmission path established by communicating between the transmit terminal 20T and the receive terminal 20R, and the information on a maximum bit rate determined on the basis of the result of the transmission path estimation is transmitted from the receive terminal 20R to the QoS controller 24.

Subsequently, when the transmit terminal 20T receives the time slot reservation response in the lower layer MAC, whether or not the time slot is obtained is notified from the lower layer MAC to the upper layer APP to obtain the time slot (S15). When the time slot is successfully obtained, the streaming data starts to be transmitted from the transmit terminal 20T to the receive terminal 20R (S16). As a result of the aforementioned process, it is possible to previously allocate the time slots required for each of the communication link and each communication line corresponding to the communication link.

In the aforementioned operation example, although the time slot reservation request is transmitted from the transmit terminal 20T to the QoS terminal 24 to obtain the time slot, the time slot may be obtained by reading the setting of the operation mode from the receive terminal 20R, obtaining the data type information, and issuing the time slot reservation request from the receive terminal 20R.

Figure 8:
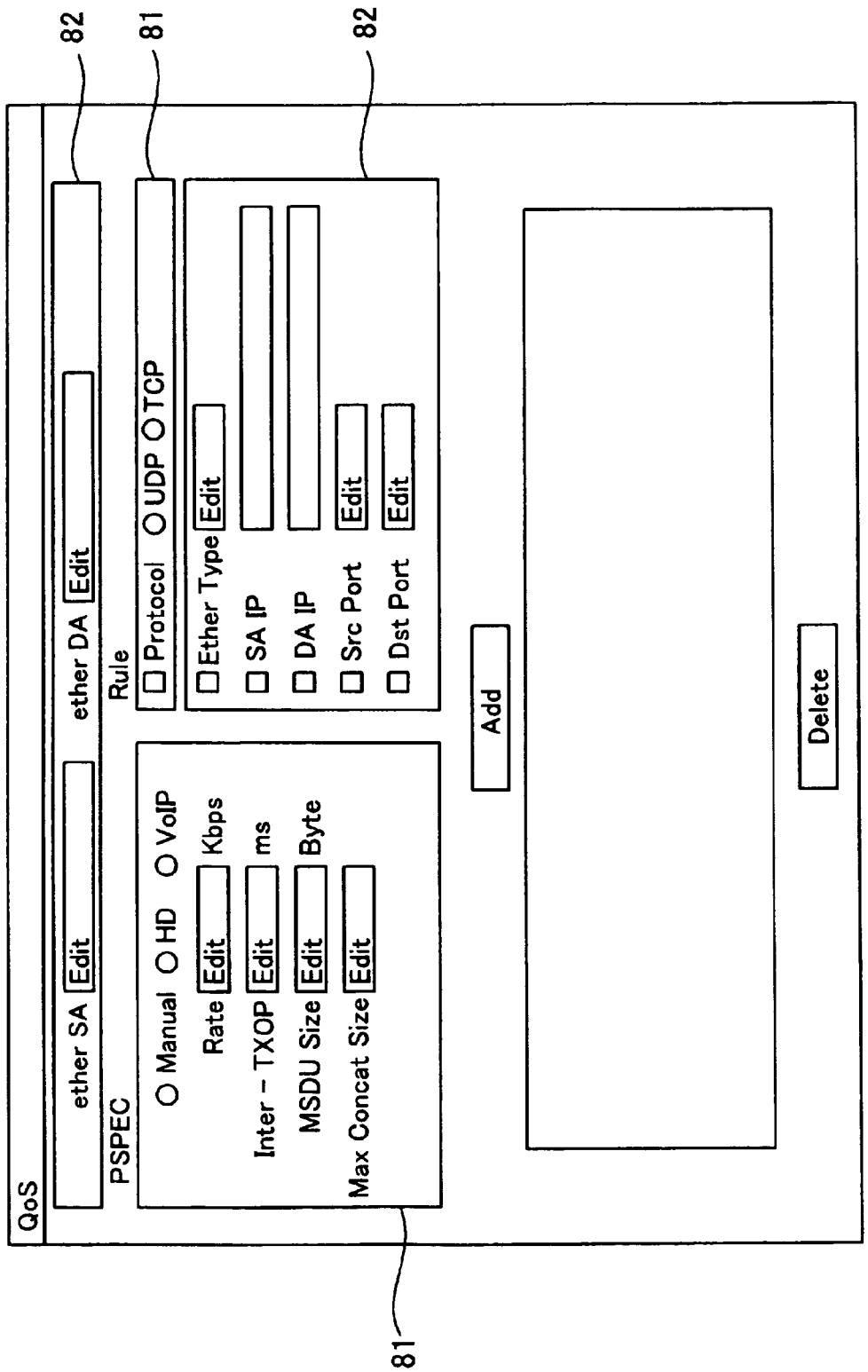
FIG. 8 is a diagram illustrating a setting input window for setting time slot reservation.

In other words, parameters for guaranteeing the QoS may be previously set by the master device 21 in detail. FIG. 8 is a diagram illustrating an example of a setting input window for setting the time slot reservation. A user inputs the setting of the required time slot, the type of the data transmitted between communication devices on the PLC network 15, or the like, in order to set the time slot reservation using a PLC adaptor functioning as a master device having a QoS control function. In this case, the input window illustrated in FIG. 8 is displayed on a display monitor of a personal computer connected to the PLC adaptor or a television set, and a value or a selection instruction is input using a manipulation means such as a key.

On the setting input window for setting the time slot reservation, some input items such as a QoS parameter 81 relating to modification deviations of a transmission speed or a delay time of the transmitted data and terminal information 82 relating to where the data is to be transmitted from and to, and the like, are set. The QoS parameter 81 may be manually set by directly inputting values such as a time interval of the time slot, or previously established values may be input by selecting the type of the data, such as high definition video data and the VoIP data. As described above, the time slot allocation is performed by the QoS controller on the basis of the setting information obtained by setting information on the communication devices corresponding to a source and a destination for transmitting and receiving the data and information on the type of the data.

In the construction of the communication system illustrated in FIG. 1, one of the PLC adaptors 20A to 20F is set as a master device operated as a control terminal having a QoS control function, and other PLC adaptors are set as slave devices operated as the transmit terminal or the receive terminal having a switch for setting the operation mode. Accordingly, the allocation and control of the time slot are performed for each communication line corresponding to the communication link established between particular communication devices by using the QoS controller of the master device on the basis of the setting of the slave device. As a result, it is possible to allocate and obtain an appropriate time slot depending on the type of the data transmitted from each communication line by performing setting of the switches 27A to 27D for each Ethernet communication port corresponding to the communication connectors 26a to 26d to which electric devices are connected in the PLC adaptor 20 of the slave device as shown in FIG. 2.

According to the first embodiment, it is possible to perform data communication by interconnecting the PLC network and the Ethernet network having the Ethernet communication interface with each other and obtaining the required time slot between the networks.

Figure 9:
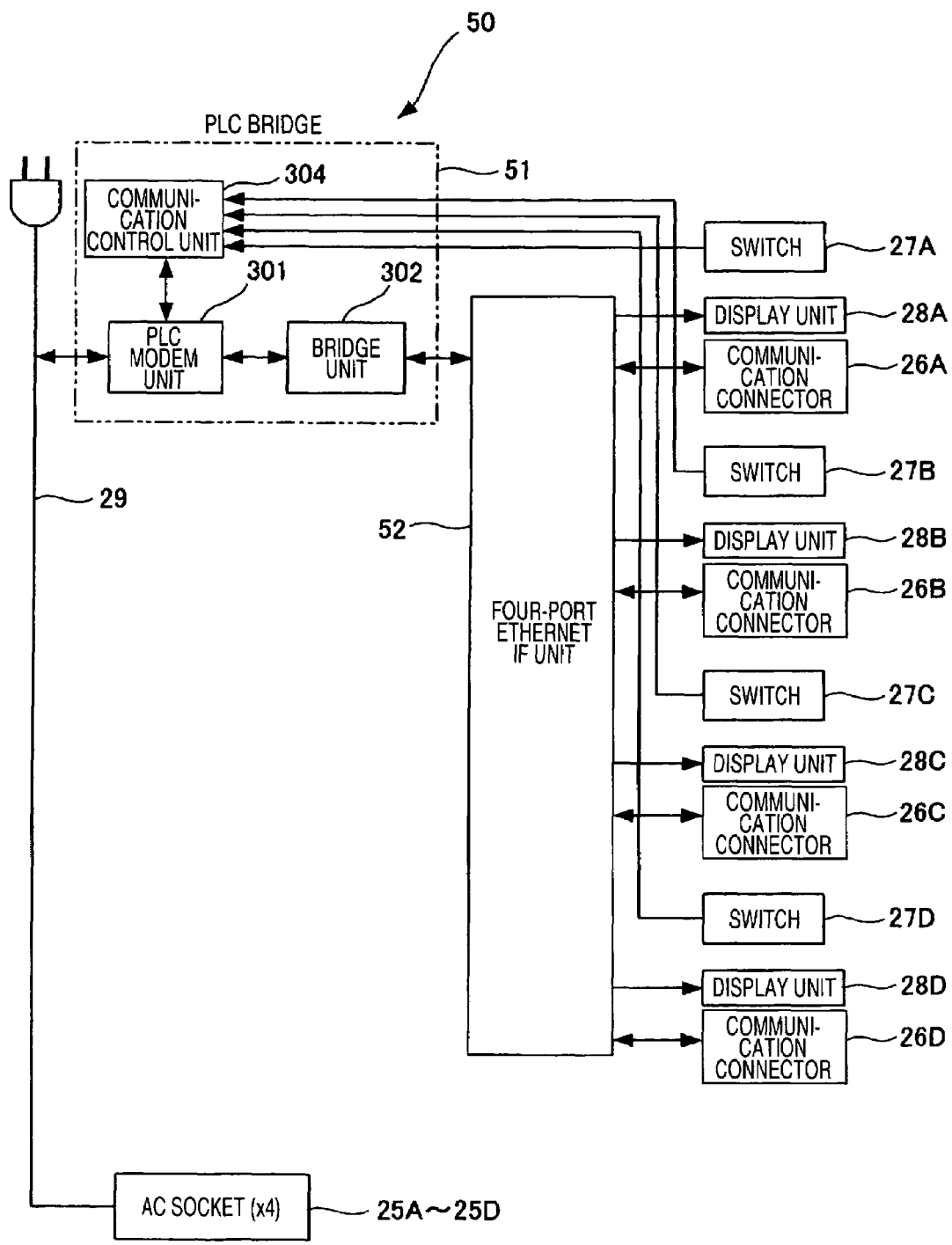
FIG. 9 is a block diagram illustrating an internal functional diagram of a power line communication apparatus according to the second embodiment.

FIG. 9 is a block diagram illustrating internal functional components of a power line communication apparatus according to the second embodiment. In FIG. 9, like reference numerals denote like elements, similarly to those of the first embodiment illustrated in FIG. 3, in which only constructions and operations different from those of the first embodiment will be described.

The PLC adaptor 50 according to the second embodiment includes a single PLC bridge 51 and a four-port Ethernet interface (IF) unit 52. External appearance of the PLC adaptor 50 is similar to that shown in FIG. 2, in which four AC sockets 25A to 25D, four communication connectors 26A to 26D, four switches 27A to 27D, four display units 28A to 28D, and an AC electric cord 29 are included.

Similarly to the first embodiment, the PLC bridge 51 according to the second embodiment includes a PLC modem unit 301, a bridge unit 302, and a communication control unit 304. Switch units 27A to 27D are connected to the communication control unit 304 of the PLC bridge 51. In addition, communication connectors 26A to 26D and display units 28A to 28D are correspondingly connected to each port of a four-port Ethernet IF unit 52. This four-port Ethernet IF unit 52 is a communication interface having four independent Ethernet communication ports, and functions as a conventional switching hub or a hub.

In the aforementioned construction according to the second embodiment, it is necessary to set priorities of communication ports in a particular communication line on an Ethernet network in order to guarantee the QoS, in addition to the allocation of the time slot on the PLC network described in the first embodiment. Since the CSMA/CA control is performed when each communication device transmits data on the Ethernet network, collision may occur between the signals simultaneously transmitted from a plurality of communication devices, so that a delay time may increase. Therefore, the required QoS may not be guaranteed when the streaming data is transmitted.

Therefore, according to the second embodiment, priorities of data packets are controlled when the data packets are transmitted from the PLC modem unit 301 of the PLC bridge 51 of the PLC adaptor 50 to the communication connectors 26A to 26D via the bridge unit 302 and the four-port Ethernet IF unit 52.

First of all, the communication control unit 304 of the PLC bridge 51 identifies an operation mode of the communication port corresponding to each communication connector 26A to 26D on the basis of the selected condition of the switches 27 to 27D of a corresponding device, and issues a time slot reservation request so as to obtain the time slot depending on the operation mode in the communication link of each communication port. For example, when the switch 27A is set to the mode C (for VoIP), and the switch 27B is set to the mode B (for video B), the time slot reservation request is transmitted to the master device so as to obtain the time slot required for both the VoIP contents and the normal video contents in order to prevent loss of data from both the VoIP and normal video contents. Operations of the time slot allocation process on the PLC network are similar to those of the first embodiment. The communication unit of the master device allocates the time slot required to transmit the data on both the contents on the PLC network in response to the time slot reservation request when the time slot reservation request is received from the communication unit of the slave device.

In addition, the communication control unit 304 determines whether or not the Ethernet communication ports corresponding to the communication connectors 26A to 26D are connected to the communication line of the communication link to which the time slot is allocated on the basis of the selection state of the switches 27A to 27D. As a result, the priorities of the communication ports are set by writing information on the priorities to a header portion of the data packet transmitted from the PLC modem unit 301 when the data are transmitted between the communication ports to which the time slot is allocated. Finally, the data are transmitted from the PLC modem unit 301 to the corresponding Ethernet communication ports in the order of a higher priority.

In other words, when the data are transmitted between the corresponding communication ports by detecting the communication ports used by the communication link to which the time slot is allocated without reading the selection states of the switches 27A to 27D, information on priorities is written to the header portion of the data packet transmitted from the PLC modem unit 301 to control the priorities of the communication ports.

The data packet transmitted from the PLC modem unit 301 is transmitted to the four-port Ethernet IF unit 52 via the bridge unit 302. On the Ethernet network, the data packet is transmitted to a destination node (e.g., the communication connector 26A to 26D of the corresponding communication port) on the basis of the priority of the transmitted data packet while the required QoS is guaranteed. When the four-port Ethernet IF unit 52 has a function of the switching hub, the data may be transmitted by switching to each communication port. Therefore, it is possible to certainly guarantee the QoS of a particular communication line on the Ethernet network by using a function of the switching hub.

When different types of electric devices are connected to the communication connectors 26A to 26D of the PLC adaptor 50, a variety of types of data packets are mixedly transmitted from the PLC bridge 51 to the communication connectors 26A to 26D via the four-port Ethernet IF unit 51 at any time. Therefore, a possibility of signal collision may increase due to an increased amount of traffics, and a transmission delay time of the data packet may also increase. However, when the data packets of the streaming data are transmitted by controlling the priority as described above using the PLC bridge 51, they are processed with a higher priority in comparison with other data packets. Therefore, it is possible to control the increased transmission delay time and guarantee the QoS.

As described above, according to the second embodiment, similarly to the first embodiment, it is possible to connect the PLC network and the Ethernet communication network with each other and perform data communication while the time slot is obtained between these networks.

Figure 10:
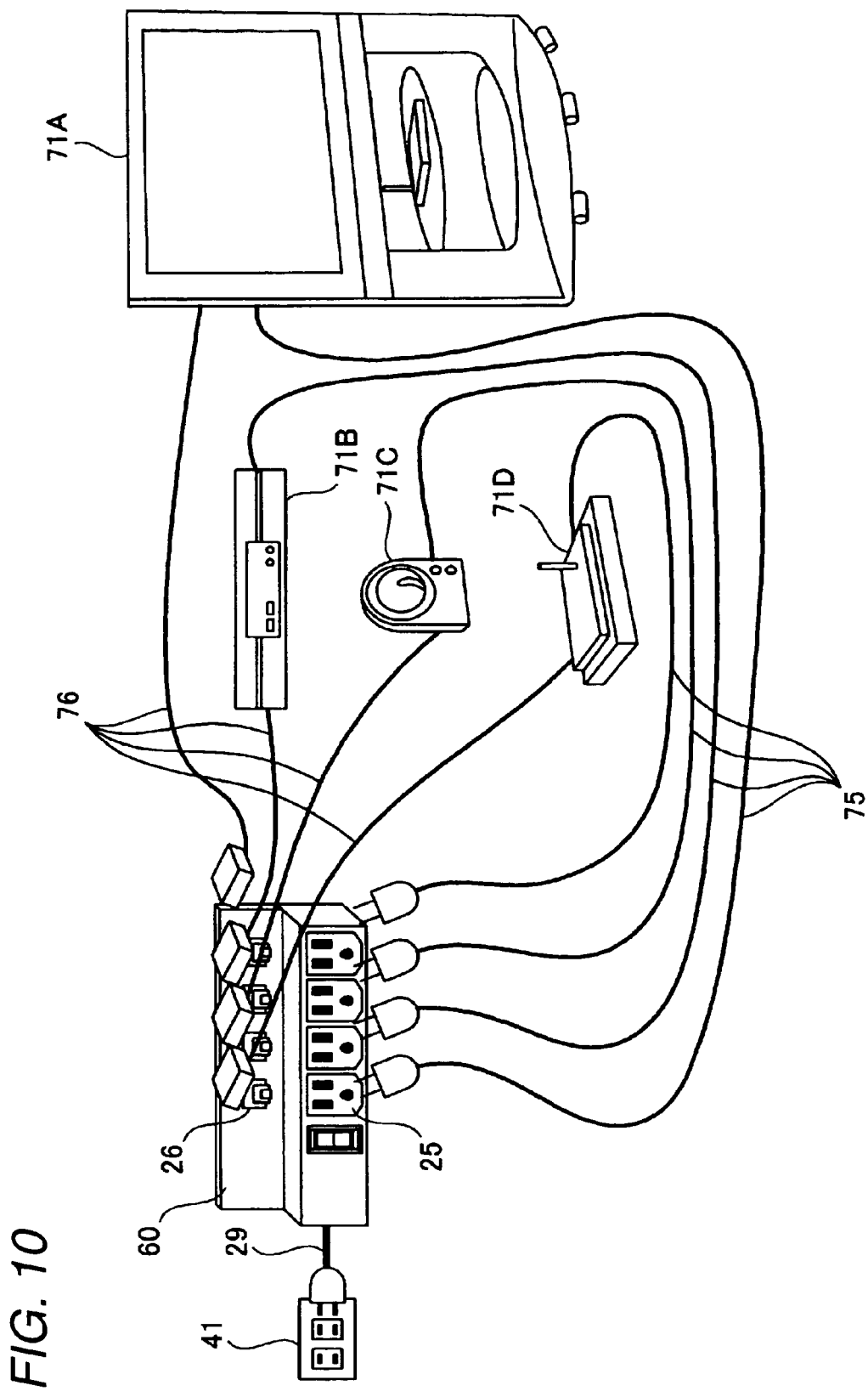
FIG. 10 is a diagram illustrating a first connection example of a PLC adaptor according to an embodiment.

FIG. 10 is a diagram illustrating a first connection example of the PLC adaptor according to the present embodiment. In FIG. 10, the PLC adaptor 60 corresponds to the PLC adaptors 20 and 50 of the first and second embodiments. In the first connection example, four electric devices capable of performing IP communication, including a television set 71A, a HDD recorder 71B, an IP camera 71C, and a set top box (STB) 71D, are connected to a single PLC adaptor. Each AC socket 25 of the PLC adaptor 60 is connected to each AC electric cord 75 of each electric device 71A to 71D. In addition, a communication cable 76 for connecting the communication ports of the electric devices 71A to 71D is connected to each communication connector 26 of the PLC adaptor 60. In addition, the AC electric cord 29 of the PLC adaptor 60 is connected to the AC socket 41. According to this construction, it is possible to transmit the data such as video data between a plurality of electric devices on the PLC network and the Ethernet network.

Figure 11:
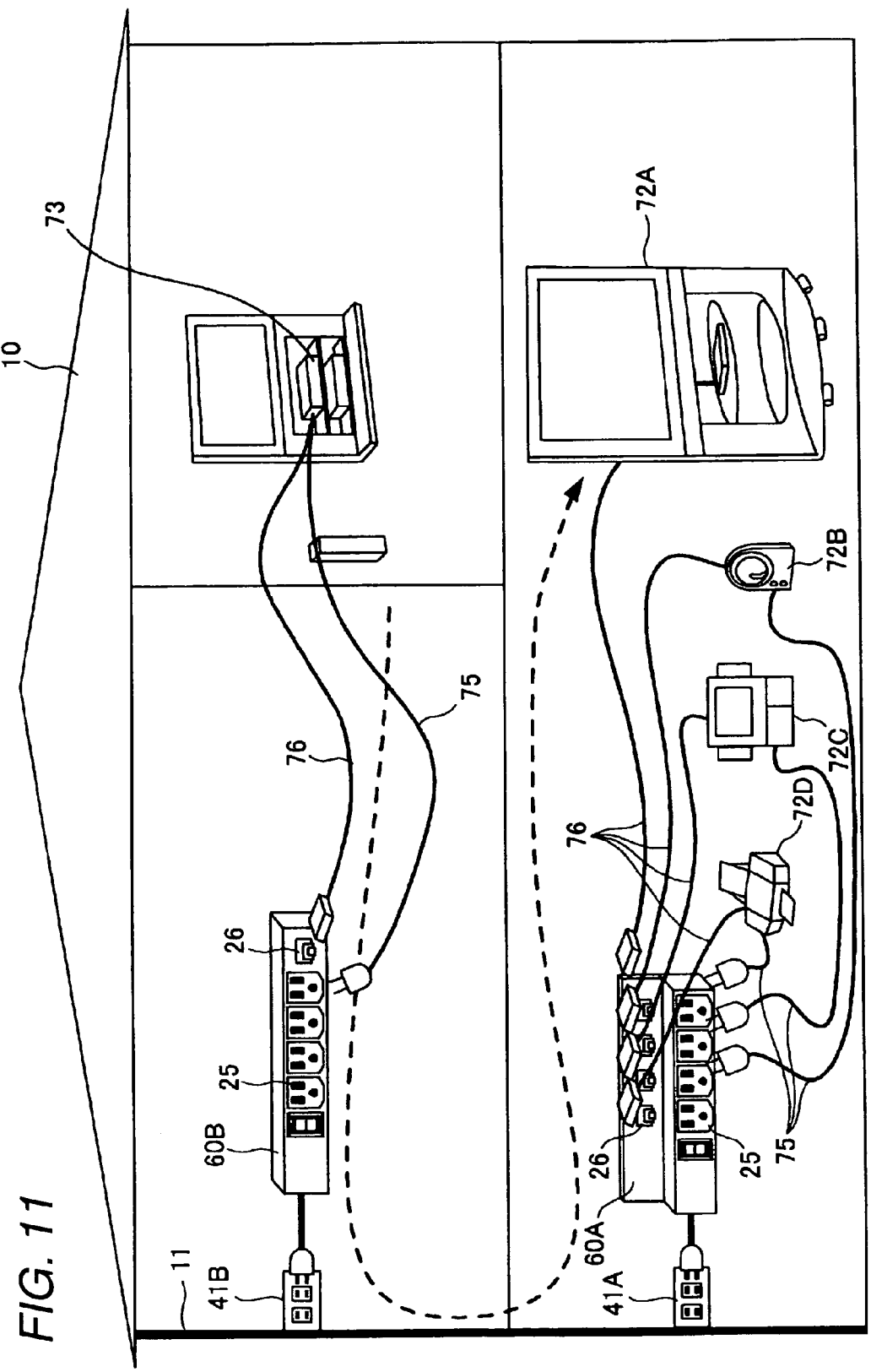
FIG. 11 is a diagram illustrating a second connection example of a PLC adaptor according to an embodiment.

FIG. 11 is a diagram illustrating a second connection example of a PLC adaptor according to the second embodiment. In the second connection example, the Ethernet communication network is connected to a four-port PLC adaptor 60A and a one-port PLC adaptor 60B. Four electric devices capable of performing IP communication, including a television set 72A, an IP camera 72B, a personal computer 72C, and a printer 72D, are connected to the PLC adaptor 60A using an AC electric cord 75 and a communication cable 76. In addition, a digital video server 73 as an electric device capable of performing IP communication is connected to another PLC adaptor 60B using the AC cord 75 and the communication cable 76. In addition, the PLC adaptors 60A and 60B are connected using AC sockets 41A and 41B and a power line 11. According to this construction, the data such as video data are transmitted on the PLC network and the Ethernet network. For example, as shown in the drawing, video contents may be transmitted between the digital video server 73 and the television set 72A provided in different rooms in a house 10 to allow a user to watch the video. In addition, the image captured by the IP camera 27B may be displayed on the personal computer 72C, and the data on the personal computer 72C may be printed out on the printer 72D.

Figure 12:
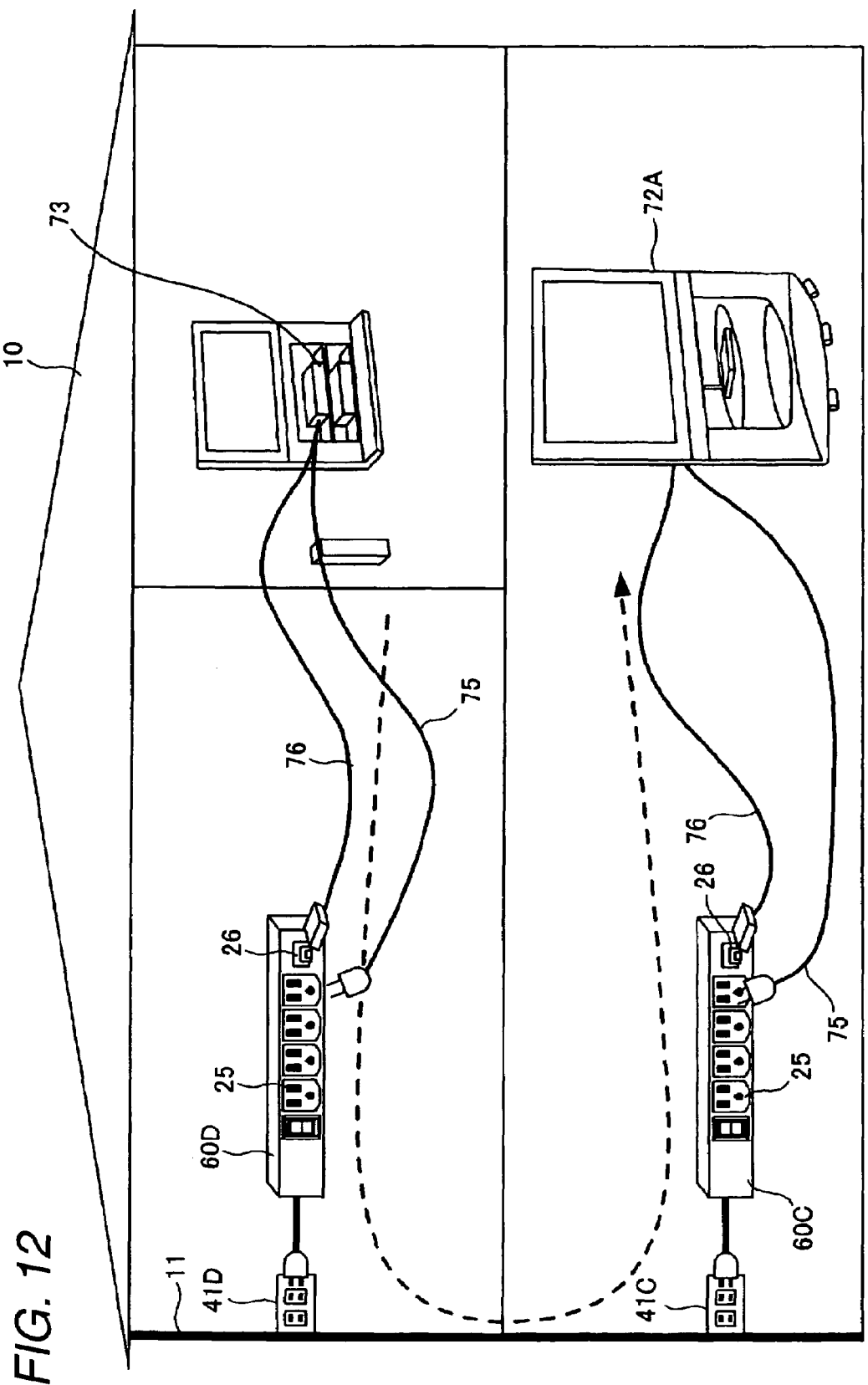
FIG. 12 is a diagram illustrating a third connection example of a PLC adaptor according to an embodiment.

FIG. 12 is a diagram illustrating a second connection example of the PLC adaptor according to the present embodiment. In the third connection example, the Ethernet communication network is connected to two one-port PLC adaptors 60C and 60D. A television set 72A as an electric device capable of performing IP communication is connected to the PLC adaptor 60C using the AC cord 75 and the communication cable 76. In addition, a digital video server 73 as an electric device capable of performing IP communication is connected to another PLC adaptor 60D using the AC cord 75 and the communication cable 76. In addition, the PLC adaptors 60C and 60D are connected to the AC sockets 41C and 41D using a power line 11. According to this construction, similarly to the second connection example, video contents may be transmitted between the digital video server 73 and the television set 72A provided in different rooms in a house 10 on the PLC network and the Ethernet network to allow a user to watch the video.

Figure 13:
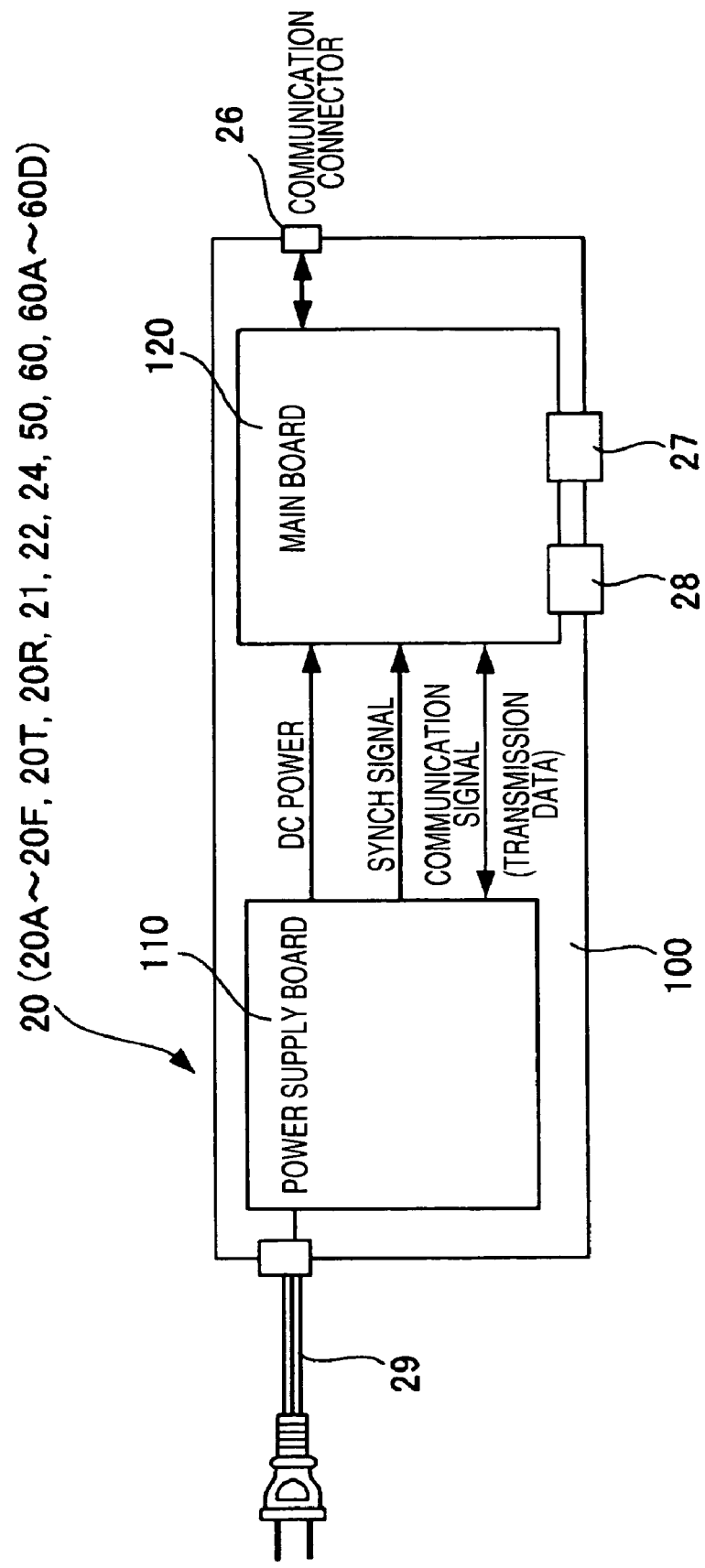
FIG. 13 is a block diagram schematically illustrating a hardware construction of a power line communication apparatus according to an embodiment.
Figure 14:
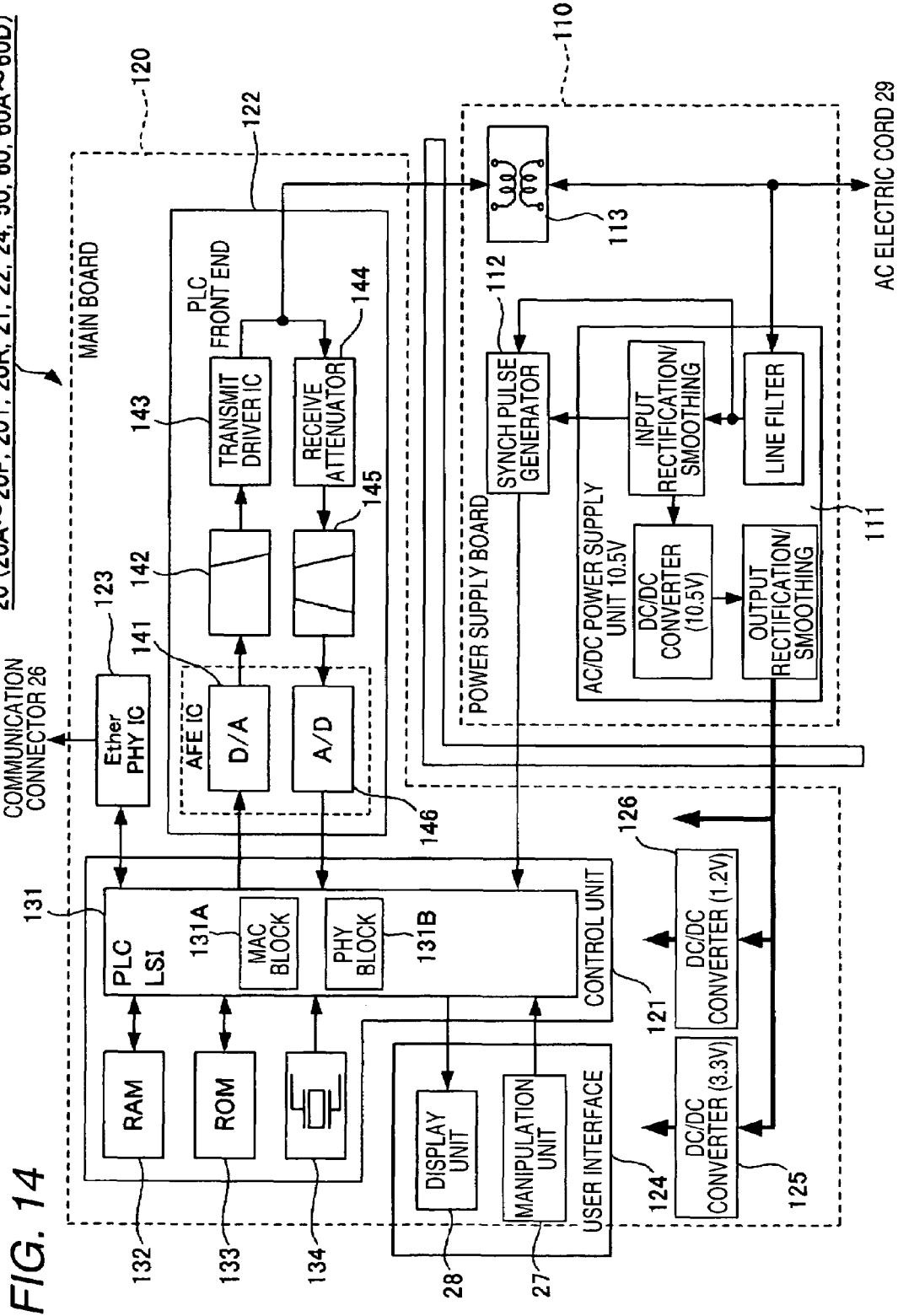
FIG. 14 is a block diagram illustrating a hardware construction of a power line communication apparatus of FIG. 13 in detail.

FIG. 13 is a block diagram schematically illustrating a hardware construction of a power line communication apparatus according to the present embodiment. FIG. 14 is a block diagram illustrating a hardware construction of the power line communication apparatus of FIG. 13 in detail.

FIGS. 13 and 14 illustrate a first example of a detailed construction of the PLC adaptor (in this example, denoted as a reference numeral 290) which functions as a power line communication apparatus according to the aforementioned embodiments. The PLC adaptor 20 includes an adaptor main body 100, an AC electric cord 29, a display unit 28 constructed of LEDs or a liquid crystal display device, a manipulation unit 27 such as a switch, and a communication connector 26 used for Ethernet communication.

The AC electric cord 29 is connected to the power line using the AC socket provided in a house in order to supply a commercial power voltage (for example, AC 100V) and connect the transmission path. The display unit 28 is constructed of LEDs or a liquid crystal display device and used to display operation conditions of the communication ports corresponding to each communication connector of the PLC adaptor 20 and notify a user of them. The manipulation unit 27 is constructed of manipulation input switches and used to input various manipulations such as switching of operation modes of each communication port of the PLC adaptor 20. Various electric devices such as a HDD recorder, a set top box (STB), a television set, an IP telephone, an IP camera, and a personal computer are connected to the communication network 26 to allow the data to be transmitted to other devices.

The adaptor main body 110 internally includes a power supply board 110 and a main board 120. The power supply board 100 receives a commercial power voltage through the AC electric cord 29 and generates a DC power voltage to output it to the main board 120 and other elements in the device. In addition, the power supply board 110 and the main board 120 are electrically connected with each other in order to supply a DC current and a variety of signals. In addition, the display unit 28 and the manipulation unit 27 are connected to the main board 120 using the communication connector 26.

The power supply board 110 and the main board 120 are internally constructed as shown in FIG. 14. The power supply board 110 includes an AC/DC power supply unit 111, a synchronization pulse generator unit 112, and an AC coupler 113.

The AC/DC power supply unit 111 generates a DC power voltage (for example, DC 10.5 V) required for circuit operations from the commercial power voltage (for example, AC 100 V) supplied from the AC electric cord 101. The AC/DC power supply unit 111 internally includes a circuit for stabilizing the power voltage, such as a line filter, an input rectification and smoothing unit, a DC/DC converter unit, and an output rectification and smoothing unit. The synchronization pulse generator unit 112 outputs a timing signal synchronized with the AC waveform of the power as a synchronization pulse. Specifically, the synchronization pulse generator unit 112 periodically outputs the pulse in every timing having a zero DC voltage. The AC coupler 113 includes a combined transformer and the like, and is provided between the AC electric cord 101 and the main board 120 in order to cut off a DC power or an AC power having a relatively low frequency and transmit only communication signals.

The main board 120 includes a control unit 121, a PLC front end 122, an Ethernet physical layer control unit (Ether PHY IC) 123, a user interface 124 including a display unit and a manipulation unit, and DC/DC converter units 125 and 126.

The control unit 121 includes a PLC integrated circuit (PLC LSI) 131, a RAM (SDRAM) 132, a ROM (F-ROM) 133, and a clock signal generator unit (TCXO: Temperature Compensated Xtal Oscillator) 134. The PLC integrated circuit 131 includes a digital processing circuit such a microprocessor, a MAC (Media Access Control Layer) block 131A, and a physical layer (PHY) block 131B. The RAM 132 is a readable and writable memory, and the ROM 133 is a read-only memory. They transmit and receive data from/to the PLC integrated circuit 131. The ROM 133 previously stores a program or data required for the PLC integrated circuit 131. The PLC integrated circuit 131 sequentially executes necessary programs in synchronization with the clock signal generated by the clock signal generator unit 134 in order to perform a processing for transmitting the data or a modem function in the power line communication.

The PLC front end 122 is provided between the control unit 121 and the AC coupler 113, and includes a D/A converter unit 141, a transmit filter 142, a transmit driver IC 143, a receive attenuator 144, a receive filter 145, and an A/D converter unit 146. The D/A converter unit 141 and the A/D converter unit 146 are included in an analog front end (AFE) IC shown in a dotted line.

According to the above construction, the PLC integrated circuit 131 inputs the data packets to be transmitted from the electric device connected to the PLC adaptor 20 using the Ethernet communication connector 26 and the Ethernet physical layer control unit 123, modulates the transmission data, and generates a PLC multi-carrier signal using the OFDM or the like for the digital transmission signal. The PLC multi-carrier signal output as a transmission signal from the PLC integrated circuit 131 is converted into a digital signal using the D/D converter unit 141 in the PLC front end 122, a predetermined band of signals are filtered by the transmit filter 142, and the filtered signal is amplified by the transmit driver 143. As a result, the PLC multi-carrier signal is transmitted to the power line 11 corresponding to the transmission path via the AC coupler 113 of the power supply board 110.

On the other hand, the signal transmitted from another PLC adaptor 20 corresponding to a communication counterpart to the power line 11 as a multi-carrier signal is input to the PLC front end 122 using the AC electric cord 29 of the PLC adaptor 20 of its terminal and the AC coupler 113 of the power supply board 110. An amplitude of the PLC multi-carrier signal input to the PLC front end 122 is adjusted by the receive attenuator 144, and a predetermined band of signals are passed through the signal filter 145 and converted into digital signals in the A/D converter unit 146, so as to be input to the PLC integrated circuit 131 as digital receive signals.

The PLC integrated circuit 131 demodulates the PLC multi-carrier signal that has received to obtain receive data. The obtained receive data is output from the PLC integrated circuit 131 to the electric device connected to the PLC adaptor 20 via the Ethernet physical layer control unit 123 and the communication connector 26.

In addition, the PLC integrated circuit 131 has a communication control function in the PLC adaptor operated as a master device. In other words, the PLC integrated circuit 131 has a function of managing information on the communication devices connected to the PLC network as a QoS controller function, a function of allocating the time slot to the communication link of each communication port, a function of scheduling the allocated time slot, and a function of outputting a beacon signal including the scheduling information, and performs various processes for these functions. In addition, in the PLC adaptor operated as a slave device, the PLC integrated circuit 131 has a function of requesting to obtain the time slot required for the master device on the basis of the setting of the operation mode set by the manipulation unit 27 for each communication port or results of automatic determination for the type of the transmitted data, and a function of controlling the communication timing of its terminal on the basis of the scheduling set by the master device. In other words, the PLC integrated circuit 131 requests the required time slot to the master device on the basis of the type of the data transmitted from each communication port to obtain the time slot, detects the beacon signal from the receive signals, and determines the timing of the time slot used in its terminal on the basis of the scheduling information included in the beacon signal.

Now, a power line communication apparatus including a wireless communication unit having a wireless LAN function will be described as a modification of the aforementioned power line communication apparatus. Although, in the PLC adaptor according to the present embodiment described above, the data transmission to the electric device is performed by using an Ethernet (Registered Trademark) communication interface, a wireless LAN communication interface may be used. In order to implement such a PLC adaptor, a wireless communication unit may be added to the PLC bridges 30A to 39D illustrated in FIG. 3 or the PLC bridge 51 illustrated in FIG. 9.

Figure 15:
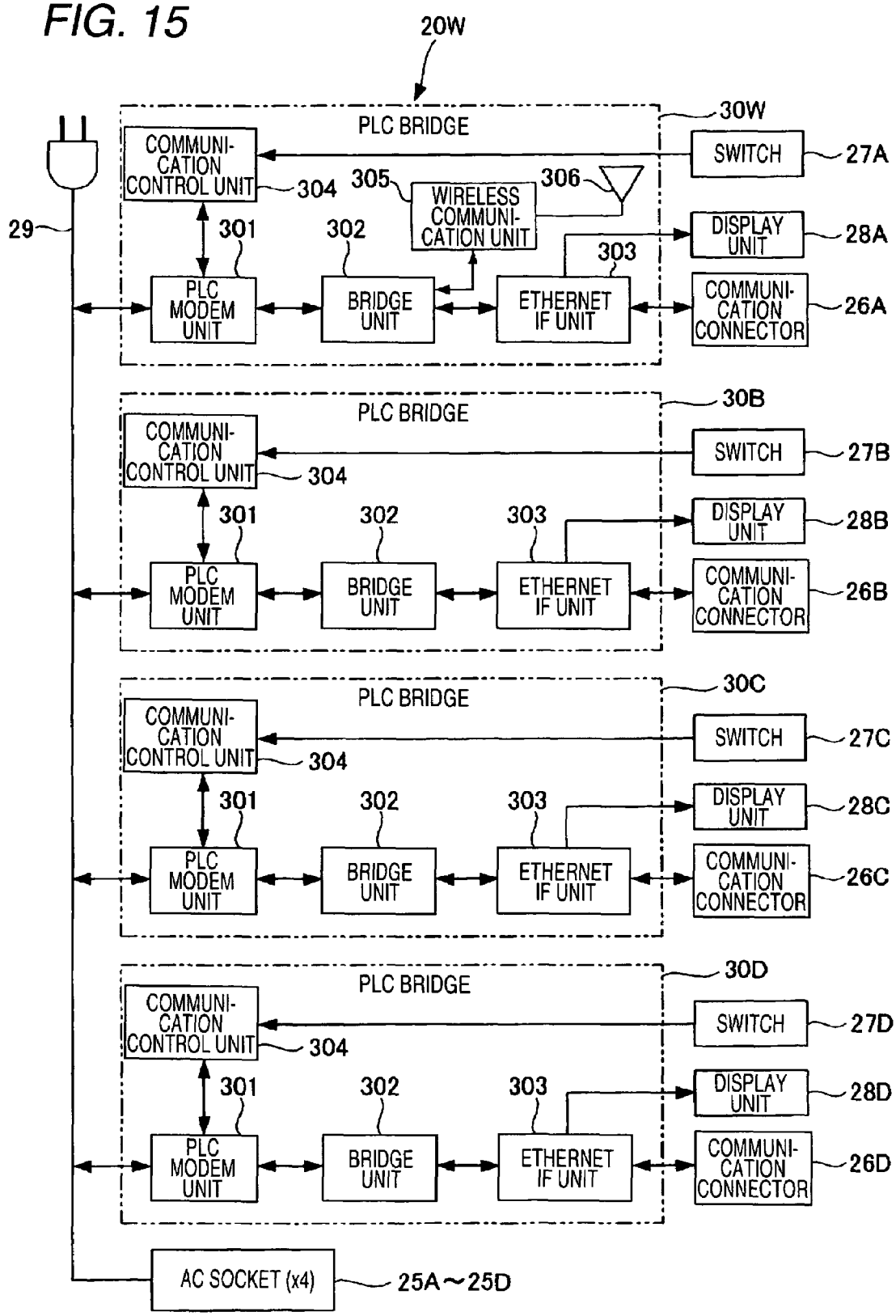
FIG. 15 is a block diagram illustrating an internal functional construction of a power line communication apparatus according a modification of the first embodiment.

FIG. 15 is a block diagram illustrating a internal functional construction of a power line communication apparatus according a modification of the first embodiment of the present invention. In the PLC adaptor 20W according to the medication of the second embodiment, the PLC adaptor 30A illustrated in FIG. 3 is substituted with a PLC bridge 30 having a wireless communication unit, and other portions are similar to those of the first embodiment. The PLC bridge 30W includes a wireless communication unit and an antenna 306 in addition to the PLC modem unit 301, the bridge unit 302, the Ethernet IF unit 303, and the communication control unit 304.

Figure 16:
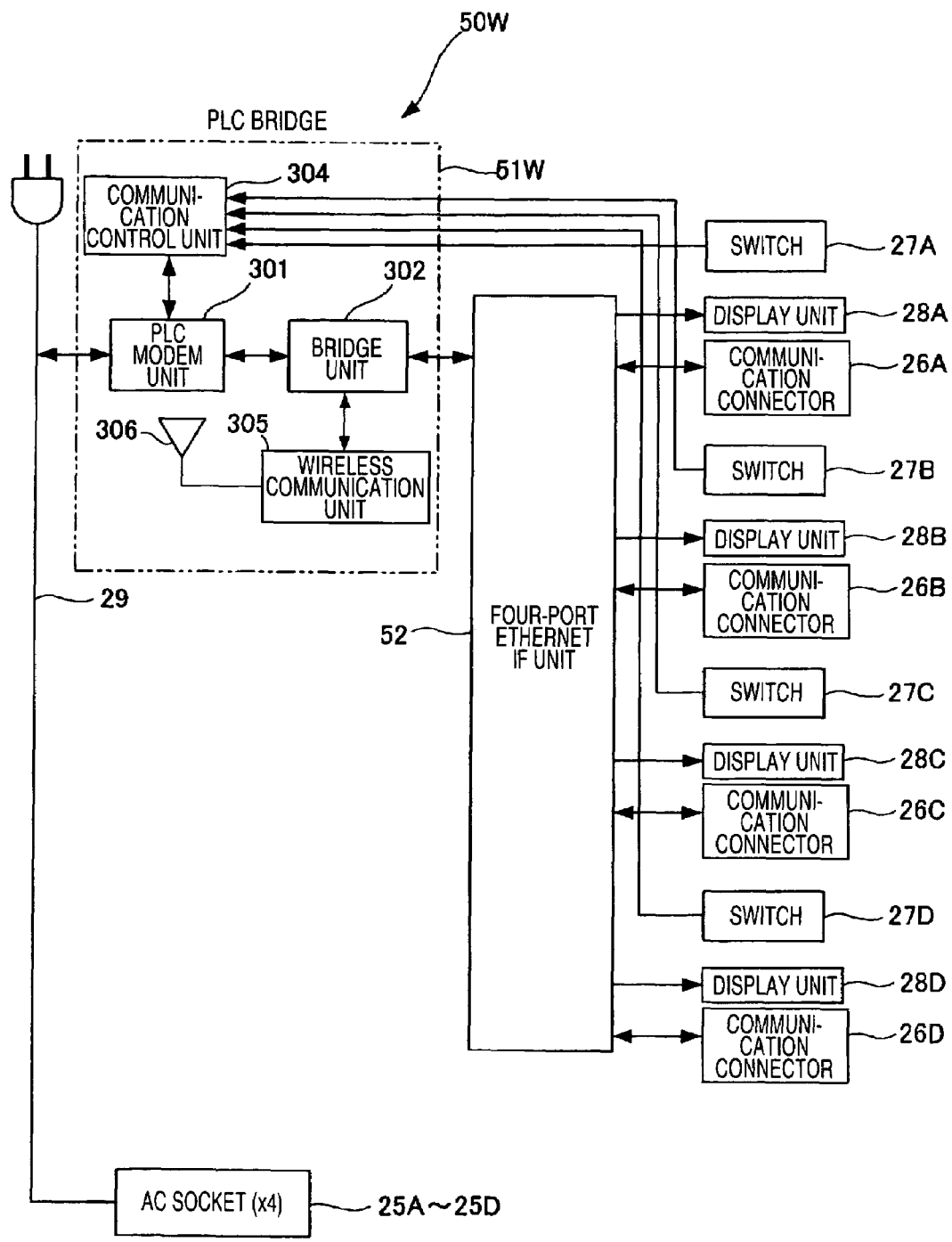
FIG. 16 is a block diagram illustrating an internal functional construction of a power line communication apparatus according to a modification of the second embodiment.

FIG. 16 is a block diagram illustrating an internal functional construction of a power line communication apparatus according to a modification of the second embodiment of the present invention. In the PLC adaptor 50W of this modification, the PLC bridge 51 illustrated in FIG. 9 is substituted with a PLC bridge 51W having a wireless communication unit, and other portions are similar to those of the second embodiment. The PLC bridge 51 includes a wireless communication unit 305 and an antenna 306 in addition to the PLC modem unit 301, the bridge unit 302, and the communication control unit 304.

In FIGS. 15 and 16, the wireless communication unit 304 provides a wireless communication function according to IEEE 802.11a, b, and g. According to the aforementioned modifications, a wireless LAN network is added to the Ethernet (Registered Trademark) network and the PLC network and connected with one another via the Ethernet communication interface and the wireless LAN communication interface. As a result, it is possible to perform data communication while the required transmission band is obtained between these networks.

Figure 17:
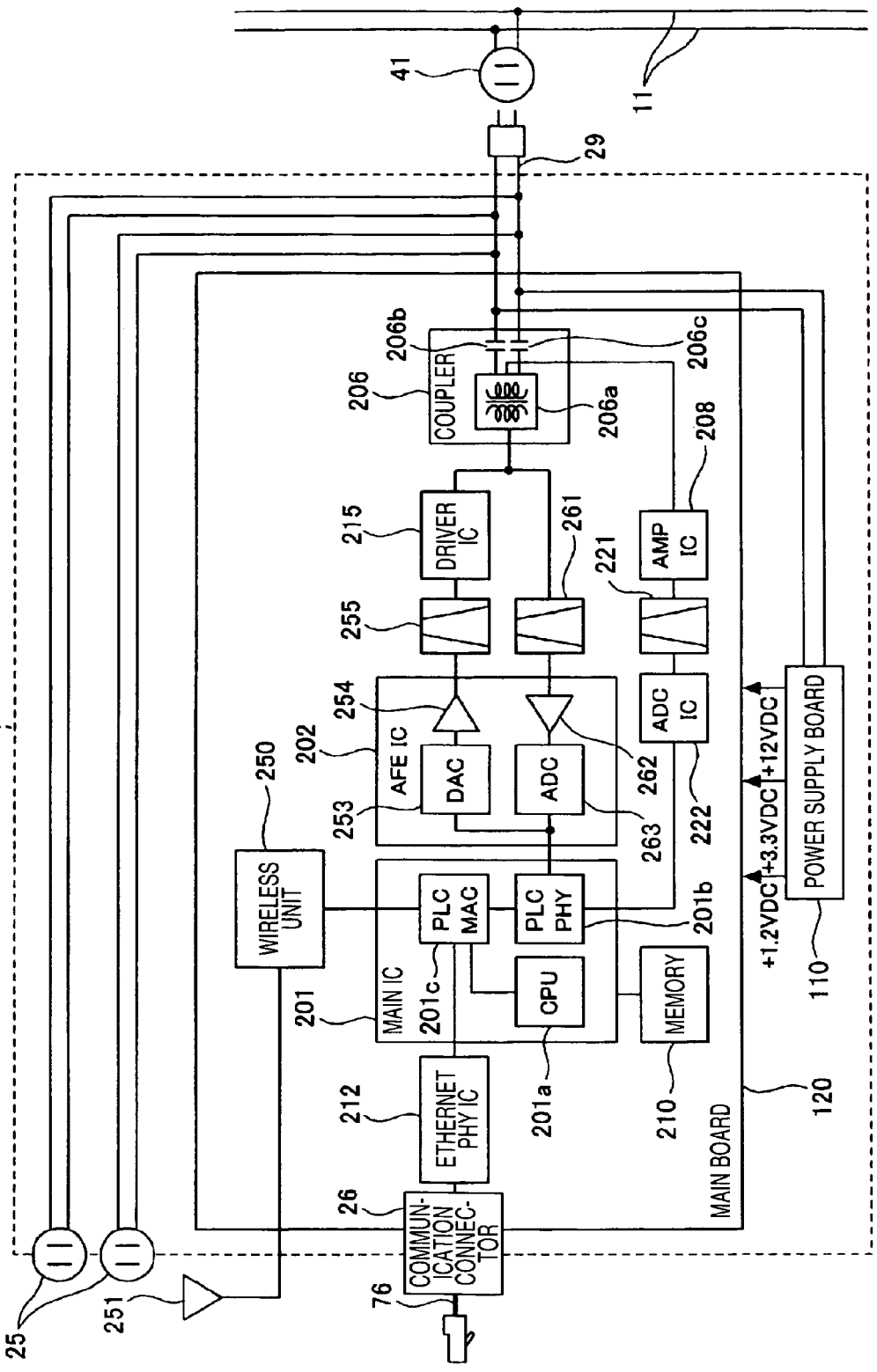
FIG. 17 is a block diagram illustrating a second example of a hardware construction of a power line communication apparatus according to an embodiment.

FIG. 17 is a block diagram illustrating a second example of a hardware construction of a power line communication apparatus according to the present embodiment. This second example corresponds to FIGS. 15 and 16, and shows a hardware construction of the PLC adaptor 70 having a wireless communication function. Similarly to the aforementioned PLC adaptor 20, the PLC adaptor 70 includes a power supply board 110, a main board 120, an AC socket 25, an AC electric cord 29, and a communication connector 26. In addition, fundamental functions or operations are similar to those of the aforementioned PLC adaptor 20.

The main board 120 internally includes a main integrated circuit 201, an analog front end integrated circuit (AFE IC) 202, a filter 25, a driver integrated circuit 215, a filter 261, a coupler 206, an amplifier (AMP IC) 208, a filter 221, an AD converter integrated circuit (ADC IC) 222, a memory 210, an Ethernet physical layer integrated circuit (Ethernet PHY IC) 212, a wireless unit 250, and an antenna 251.

The main integrated circuit 201 includes a central processing unit (CPU) 201a, a power line communication media access control (PLC/MAC) block 201b, and a power line communication physical layer (PLC/PHY) block 201c. The AFE integrated circuit 202 includes a D/A converter (DAC) 253, amplifiers 254 and 262, and an A/D converter (ADC) 262. The coupler 206 includes a coil transformer 206a and a condenser 206b.

The wireless unit 250 includes a transceiver unit, a modulation/demodulation unit, a signal processing unit, and the like to provide a wireless communication function according to IEEE 802.11 a, b, and g. The antenna 251 may be internally installed in the main body or may be externally installed in a protruded shape.

In the PLC adaptor 70 of the second example, the PLC network, the Ethernet (Registered Trademark) network, and the wireless LAN network are connected with one another via the Ethernet communication interface and the wireless LAN communication interface. As a result, it is possible to perform data communication while the time slot required between these networks is obtained.

In the PLC adaptor according to the present embodiment, the following notification functions can be provided as an example of a function of notifying a user of operation conditions. According to the present embodiment, although it is possible to obtain the time slot required to transmit the streaming data or the like on the PLC network, the time slot may not be obtained when actual conditions of the transmission path is changed, or the traffic amount increases. Therefore, the PLC adaptor is preferably constructed to measure the actual condition (such as a transmission speed) of the transmission path, for example, in a test mode operation automatically executed before the communication is initiated and notify a user of the result of the measurement.

The result of the measurement may be notified to a user by turning on/off an LED light, displaying characters or symbols on a liquid crystal display, alarming using a voice or a buzzer, or transmitting data to a terminal (such as a mobile phone) remotely distributed on a network.

For example, if three LEDs are provided in a display unit, the following four conditions can be notified as the measurement result by controlling a combination of the ON/OFF states of the LEDs.

(1) Excellent Condition (a high transmission speed (over 40 Mbps)): turning on three LEDs for ten seconds;

(2) Normal Condition (an intermediate transmission speed (20 to 40 Mbps)): turning on two LEDs for ten seconds;

(3) Bad Condition (a low transmission speed (5 to 20 Mbps): turning on a single LED for ten seconds; and (4) Significantly Bad Condition (a significantly low transmission speed (under 5 Mbps)): flickering a single LED for ten seconds.

In addition, as a modification of this notification function, an actual operation condition for the operation mode set by a user may be notified. In other words, whether or not the communication condition can actually provide a satisfactory QoS for the operation mode selected by manipulating the switch 27 may be identified on the basis of the measurement result of the test mode as described above, and the result may be notified to a user. Furthermore, when it is impossible to guarantee a desired QoS from the condition of the transmission path or the allocation of the time slot, the allocation of the time slot may stop due to errors, and a fact that the QoS can not be guaranteed may be displayed. As a result, a user can easily identify whether or not the desired data can be appropriately transmitted on the basis of the condition notification.

In addition, the setting of the operation mode using the switch 27 is not limited to the switching among five modes described above. Instead, the setting of the operation mode may be simplified, and various types of settings may be applied depending on use conditions. For example, the operation mode may be switched over between the VoIP and the video modes. In addition, the operation mode may be switched over between manual and automatic modes, and the QoS control may be switched on and off.

Although the PLC adaptor has a construction different from that of the electric device in the aforementioned embodiment, the PLC adaptor and the electric device may be integrated into a single body. In other words, the PLC adaptor may be internally provided in electric devices having an application device of an upper layer, such as a telephone, a facsimile, a video phone, and a personal computer.

According to the aforementioned embodiments, when a communication system is constructed using a PLC network, an Ethernet network, and a wireless LAN network in a house, various data including the streaming data such as video or audio data can be transmitted and reproduced without loss of data in a receiver side while a required time slot is obtained. In this case, since the required time slot can be allocated and obtained depending on a setting condition of an operation mode or the type of the data actually transmitted, it is possible to effectively use a limited amount of the time slots and transmit and reproduce the data in a high quality.

Although a data relay apparatus for promoting effective use of the time slot by modifying the time interval of the time slot has been described in the aforementioned embodiments, one or more time slots may be additionally allocated to the streaming data having a single time slot of a predetermined time interval between the beacons when the condition of the transmission path is allowable.

When the condition of the transmission path is not allowable, the number of allocated time slots may be reduced for the streaming data having two or more allocated time slots of a predetermined time interval between the beacons.

Furthermore, it is possible to promote effective use of the time slots on an entire network by setting the number and the time interval of the time slots.

The present invention can be usefully applied to a power line communication apparatus and a data relay method, in which an appropriate quality of service can be provided depending on the type of the connected electric devices and the type of the transmitted data when a power line is used as a communication transmission path, and an electric device having a communication function is connected to an Ethernet network via an Ethernet (Registered Trademark) communication interface and connected to a power line also functioning as a transmission path in order to perform data transmission between these electric devices and the transmission path.

This application is based upon and claims the benefit of priority of Japanese Patent Application No. 2005-305968 filed on Oct. 20, 2005, the contents of which are incorporated herein by reference in its entirety.

What is claimed is:

1. A power line communication apparatus for communicating data, comprising:
    a first communication unit for performing communication via a power line;
    a second communication unit for performing communication via another communication line other than the power line;
    a time slot setting unit for setting a time slot on the basis of a format of the data;
    a relay unit for relaying the data within the time slot set by the time slot setting unit between the first communication unit and the second communication unit; and
    a manipulation unit for setting the format of the data.

2. The power line communication apparatus according to claim 1, wherein the time slot setting unit sets the time slot on the basis of a packet format of the data.

3. The power line communication apparatus according to claim 1, wherein the time slot setting unit issues a time slot reservation request for requesting a time slot required to transmit the data to other power line communication apparatuses connected to the power line, and sets the time slot required to transmit the data when a time slot reservation response is received from other power line communication apparatuses.

4. The power line communication apparatus according to claim 1, wherein a quality of service (QoS) required on a network including the second communication unit is guaranteed by setting a priority on the communication line in the second communication unit.

5. The power line communication apparatus according to claim 1, wherein at least a part of the data are transmitted via the power line on the basis of a time division multiple access (TDMA) method, and
    wherein the time data slot setting unit sets the time slot required to transmit the data on the basis of a time period of the time slot for transmitting the data.

6. The power line communication apparatus according to claim 1, further comprising a display unit for displaying operation conditions including at least one of a communication condition and a setting condition of the data transmission via the communication line.

7. The power line communication apparatus according to claim 1, further comprising:
- a power input unit connected to the first communication unit to input power from the power line;
- a communication connector connected to a communication medium for transmitting data by connecting the second communication unit and an electronic device; and
- a power socket connectable to a power cord of the electric device for allowing power input from the power input unit to be supplied to the electronic device,
- wherein the power input unit is connected to the first communication unit.

8. A method of relaying data in a power line communication apparatus for transmitting data using a power line as a communication line, the method comprising steps of:
- performing, with a first communication unit, a first communication via the power line;
- performing, with a second communication unit, a second communication via at least one of communication lines other than the power line;
- setting a time slot on the basis of a format of the data;
- relaying the data within the time slot set on the basis of the format of the data between the first communication unit and the second communication unit;
- receiving an input signal from a manipulation unit; and
- setting the format of the data on the basis of the received signal.

9. The method according to claim 8, wherein, in the step of setting the time slot, the time slot is set on the basis of a packet format of the data.

10. The method according to claim 8, wherein, in the step of setting the time slot, a time slot reservation request for requesting a time slot required to transmit the data is issued to other power line communication apparatuses connected to the power line, and wherein the time slot required to transmit the data is set when a time slot reservation response is received from other power line communication apparatuses.

11. The method according to claim 8, wherein a quality of service (QoS) required on a network including the second communication unit is obtained by setting a priority of the communication line in the second communication unit.

12. The method according to claim 8, wherein at least a part of the data are transmitted via the power line on the basis of a time division multiple access (TDMA) method, and wherein, in the step of setting the time slot, the time slot required to transmit the data is set on the basis of a time period of a time slot for transmitting the data.

13. The method according to claim 8, further comprising a step of displaying an operation condition including at least one of a setting condition and a communication condition of data transmission via the communication line.

14. A power line communication apparatus for communicating data, comprising:
- a first communication unit for performing communication via a power line;
- a second communication unit for performing communication via another communication line other than the power line;
- a time slot setting unit for setting a time slot on the basis of a format of the data;
- a relay unit for relaying the data within the time slot set by the time slot setting unit between the first communication unit and the second communication unit; and
- a setting unit for setting the format of the data.

15. A method of relaying data in a power communication apparatus for transmitting data using a power line as a communication line, the method comprising the steps of:
- performing, with a first communication unit, a first communication via the power line;
- performing, with a second communication unit, a second communication via at least one of communication lines other than the power line;
- setting a time slot on the basis of a format of the data;
- relaying the data within the time slot set on the basis of the format of the data between the first communication unit and the second communication unit; and
- receiving an input signal from a setting unit, and setting the format of the data on the basis of the received input signal.

* * * * *